(12) United States Patent
Kanai

(10) Patent No.: US 11,703,425 B2
(45) Date of Patent: Jul. 18, 2023

(54) INFORMATION PROCESSING APPARATUS, SYSTEM, PRODUCTION FACILITY, INFORMATION PROCESSING METHOD, METHOD OF MANUFACTURING PRODUCTS, AND RECORDING MEDIUM

(71) Applicant: CANON KABUSHIKI KAISHA, Tokyo (JP)

(72) Inventor: Hiroki Kanai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/514,010

(22) Filed: Oct. 29, 2021

(65) Prior Publication Data
US 2022/0136931 A1 May 5, 2022

(30) Foreign Application Priority Data

Nov. 5, 2020 (JP) .................................. 2020-185175
Aug. 19, 2021 (JP) .................................. 2021-134217

(51) Int. Cl.
*G06F 11/30* (2006.01)
*G01M 99/00* (2011.01)

(52) U.S. Cl.
CPC ................................ *G01M 99/005* (2013.01)

(58) Field of Classification Search
CPC .................................................. G01M 99/005
See application file for complete search history.

(56) References Cited

U.S. PATENT DOCUMENTS

| 4,337,513 A * | 6/1982 | Furuhashi | F02D 41/005 |
| | | | 718/103 |
| 2020/0039453 A1* | 2/2020 | Iida | G06F 9/5038 |

FOREIGN PATENT DOCUMENTS

| JP | 2002-049498 A | 2/2002 |
| JP | 2009-258831 A | 11/2009 |
| JP | 2010-220036 A | 9/2010 |
| JP | 2018-067135 A | 4/2018 |

\* cited by examiner

*Primary Examiner* — Phuong Huynh
(74) *Attorney, Agent, or Firm* — Venable LLP

(57) ABSTRACT

An information processing apparatus configured to be connected to a sensor used to measure a state of a machine apparatus includes a processing portion. The information processing apparatus includes a processing portion configured to measure the state of the machine apparatus by using the sensor and executing a measurement task corresponding to an event condition that has been satisfied. The event condition is one of a plurality of event conditions associated with a plurality of measurement tasks. The processing portion is configured to execute a priority process in which when two or more event conditions of the plurality of event conditions have been satisfied, two or more measurement tasks corresponding to the two or more event conditions are executed in order of priority.

42 Claims, 17 Drawing Sheets

FIG.3

NODE NUMBER : 104

| TASK NUMBER | EVENT CONDITION | PRIORITY | AD CONVERSION PROCESS | SIGNAL PROCESSING | OUTPUT PROCESS |
|---|---|---|---|---|---|
| 1 | 60-MINUTE INTERVAL | 2 | ch1, 10kHz, 0-5V 5,000 PIECES AMPLIFICATION FACTOR 50 | AVERAGE VALUE PROCESS | WIRELESS COMMUNI-CATION(GW) TASK3(>50) |
| 2 | 24-HOUR INTERVAL | 1 | ch2, 54kHz, 0-5V 10,000 PIECES AMPLIFICATION FACTOR 50 | FFT PROCESS | WIRE COMMUNI-CATION(GW) |
| 3 | CALL | 1 | ch2, 54kHz, 0-5V 10,000 PIECES AMPLIFICATION FACTOR 50 | AVERAGE VALUE PROCESS | WIRELESS COMMUNI-CATION(GW) |

FIG.6A

| TYPE OF PROCESSING | PROPORTIONALITY CONSTANT K |
|---|---|
| AVERAGE VALUE PROCESS | $2 \times 10^{-5}$ |
| EFFECTIVE VALUE PROCESS | $1 \times 10^{-5}$ |
| FFT PROCESS | $2 \times 10^{-4}$ |

FIG.6B

| WAY OF OUTPUTTING | PROPORTIONALITY CONSTANT L |
|---|---|
| WIRELESS COMMUNICATION | $1 \times 10^{-4}$ |
| WIRE COMMUNICATION | $2 \times 10^{-5}$ |
| WRITING | $1 \times 10^{-5}$ |

FIG.7

| PRIORITY | SIGNAL PROCESSING |
|---|---|
| 1 | MAXIMUM VALUE PROCESS |
| 1 | MINIMUM VALUE PROCESS |
| 1 | AVERAGE VALUE PROCESS |
| 2 | EFFECTIVE VALUE PROCESS |
| 3 | FFT PROCESS |

INFORMATION PROCESSING APPARATUS, SYSTEM, PRODUCTION FACILITY, INFORMATION PROCESSING METHOD, METHOD OF MANUFACTURING PRODUCTS, AND RECORDING MEDIUM

BACKGROUND OF THE INVENTION

Field of the Invention

The present invention relates to information processing.

Description of the Related Art

In recent years, predictive maintenance is performed. In the predictive maintenance, the state of a machine apparatus incorporated in a facility, such as a production facility, is measured by using sensors, and the replacement of a component of the machine apparatus, or the repair or the update of the machine apparatus is performed depending on deterioration state of the machine apparatus. Thus, the predictive maintenance can reduce unnecessary replacement of components and labor costs. In addition, since the sensors are disposed in the machine apparatus for collecting measurement data for obtaining the state of the machine apparatus incorporated in a facility such as a production facility, any failure or abnormal state of the machine apparatus can be detected early, and the machine apparatus can be diagnosed in detail.

Japanese Patent Application Publication No. 2010-220036 proposes an apparatus to which a plurality of sensors can be connected. The apparatus acquires sensing data or measurement data from each of the plurality of sensors, in a sensing cycle assigned to the sensor. By the way, if one sensing timing is equal to another sensing timing, a packet collision may occur. However, the apparatus described in Japanese Patent Application Publication No. 2010-220036 prevents the packet collision by shifting a sensing timing of a sensor having a longer sensing cycle, with respect to a sensing timing of a sensor having a shorter sensing cycle.

SUMMARY OF THE INVENTION

According to a first aspect of the present invention, an information processing apparatus configured to be connected to a sensor used to measure a state of a machine apparatus includes a processing portion. The information processing apparatus includes a processing portion configured to measure the state of the machine apparatus by using the sensor and executing a measurement task corresponding to an event condition that has been satisfied. The event condition is one of a plurality of event conditions associated with a plurality of measurement tasks. The processing portion is configured to execute a priority process in which when two or more event conditions of the plurality of event conditions have been satisfied, two or more measurement tasks corresponding to the two or more event conditions are executed in order of priority.

According to a second aspect of the present invention, a system includes a gateway apparatus, a sensor used to measure a state of a machine apparatus, and a node apparatus connected with the sensor and configured to transmit measurement data to the gateway apparatus by using wireless communications or wire communications. The node apparatus includes a processing portion configured to measure the state of the machine apparatus by using the sensor and executing a measurement task corresponding to an event condition that has been satisfied, the event condition being of a plurality of event conditions associated with a plurality of measurement tasks. The processing portion is configured to execute a priority process in which when two or more event conditions of the plurality of event conditions have been satisfied, two or more measurement tasks corresponding to the two or more event conditions are executed in order of priority.

According to a third aspect of the present invention, an information processing method that causes a processing portion to measure a state of a machine apparatus by using a sensor includes executing a measurement task corresponding to an event condition that has been satisfied. The event condition is one of a plurality of event conditions associated with a plurality of measurement tasks. The method includes executing, by the processing portion, a priority process in which when two or more event conditions of the plurality of event conditions have been satisfied, two or more measurement tasks corresponding to the two or more event conditions are executed in order of priority.

Further features of the present invention will become apparent from the following description of exemplary embodiments with reference to the attached drawings.

BRIEF DESCRIPTION OF THE DRAWINGS

FIG. 3 is a diagram illustrating one example of a task table of the first embodiment.

FIG. 6A is a diagram illustrating one example of a first table of the first embodiment.

FIG. 6B is a diagram illustrating one example of a second table of the first embodiment.

FIG. 7 is a diagram illustrating a priority table that an information processing method of a second embodiment uses.

DESCRIPTION OF THE EMBODIMENTS

For diagnosing a machine apparatus, there may be a type of measurement that needs urgency. However, the technique described in Japanese Patent Application Publication No. 2010-220036 focuses on the prevention of packet collisions, not on the urgency of measurement. Thus, the timing of measurement is not necessarily appropriate for diagnosing an apparatus, such as a machine apparatus.

One or more aspects of the present invention is to measure the state of a machine apparatus at appropriate timings.

Hereinafter, some embodiments of the present invention will be described in detail with reference to the accompanying drawings.

First Embodiment

Figure 1:
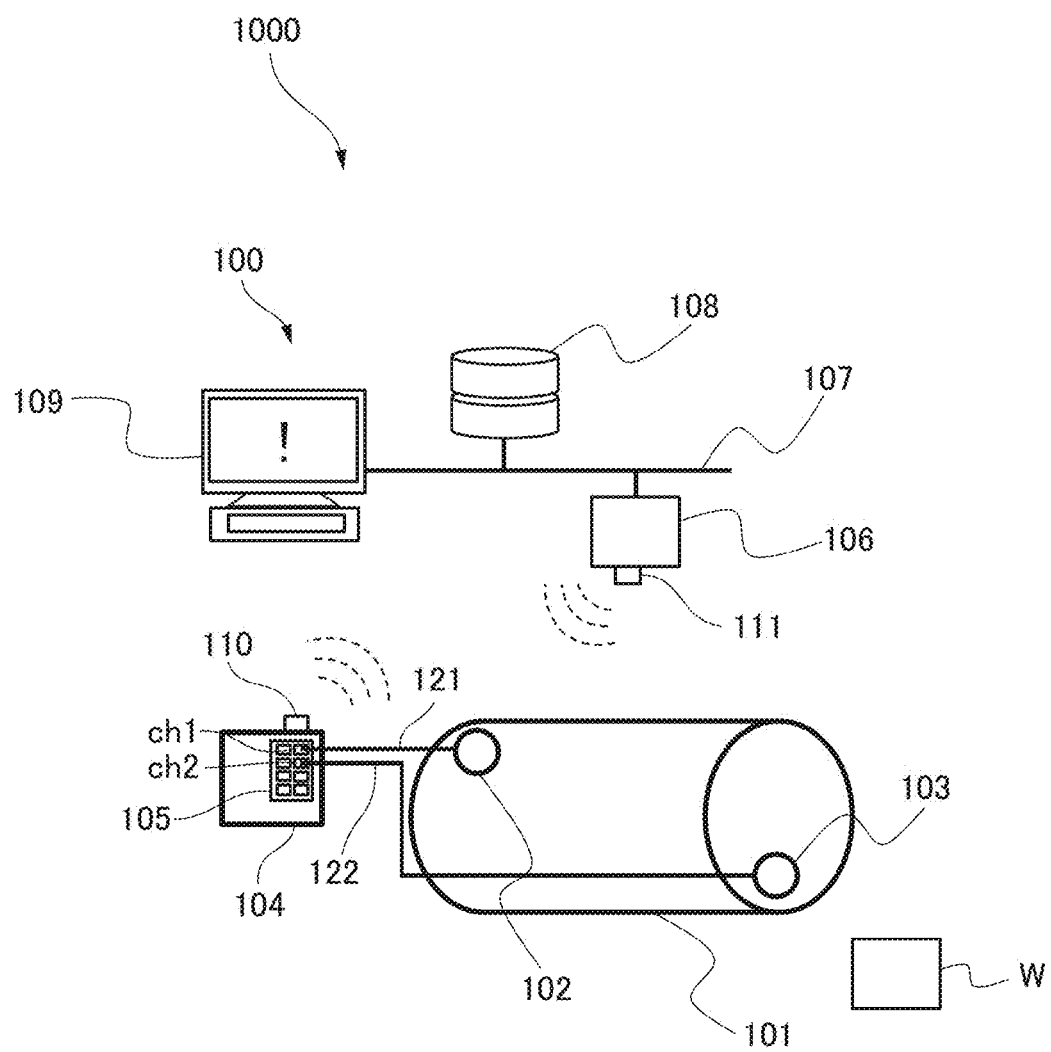
FIG. 1 is a schematic diagram of a production facility of a first embodiment.

FIG. 1 is a schematic diagram of a production facility 1000 of a first embodiment. The production facility 1000 is installed in a factory or the like, and is used for manufacturing a product W. The production facility 1000 includes a machine apparatus 101 that is an object to be monitored, and a monitoring system 100 that is one example of systems and that monitors the object. For example, the machine apparatus 101 is a pump. The production facility 1000, which includes the machine apparatus 101, manufactures the product W by using a predetermined manufacturing method, while monitoring the machine apparatus 101 by causing the monitoring system 100 to measure the state of the machine apparatus 101. The product W may be a finished product, or may be an intermediate product that is still not finished.

The monitoring system 100 is used for the predictive maintenance of the machine apparatus 101. By the monitoring system 100 monitoring the machine apparatus 101, the failure or abnormal state of the machine apparatus 101 can be detected early, and the machine apparatus 101 can be diagnosed in detail.

The monitoring system 100 includes at least one sensor used for monitoring the machine apparatus 101. In the present embodiment, the at least one sensor may be a plurality of (e.g., two) sensors 102 and 103. In addition, the monitoring system 100 includes a monitoring node apparatus 104, a monitoring gateway apparatus 106, a database 108, and a terminal 109. The monitoring node apparatus 104 is one example of monitoring devices, and one example of node apparatuses. The monitoring gateway apparatus 106 is one example of gateway apparatuses.

The sensors 102 and 103 are disposed in the machine apparatus 101 for measuring the state of the machine apparatus 101. Each of the sensors 102 and 103 may be a vibration sensor, an acceleration sensor, a pressure sensor, a photosensor, a torque sensor, or a temperature sensor; and measures the state of the machine apparatus 101, quantifies the state as a physical quantity into sensor data, and outputs the sensor data. For example, the vibration sensor outputs the intensity of vibration, as a voltage that is a physical quantity.

The monitoring node apparatus 104 includes a terminal portion 105 to which the sensors can be connected. The terminal portion 105 includes a plurality of channel terminals to which the plurality of sensors can be connected. In the present embodiment, a channel terminal 1ch of the plurality of channel terminals of the terminal portion 105 is connected with the sensor 102, and another channel terminal 2ch of the plurality of channel terminals of the terminal portion 105 is connected with the sensor 103. The sensor 102 and the channel terminal 1ch are connected with each other via a cable 121 that includes, for example, a power line, a ground line, and a signal line. The sensor 103 and the channel terminal 2ch are connected with each other via a cable 122 that includes, for example, a power line, a ground line, and a signal line.

The monitoring node apparatus 104 is one or more in number, which is determined as necessary; and is disposed in the monitoring system 100. In the present embodiment, the description will be made for a case where the monitoring system 100 includes a single monitoring node apparatus. However, the monitoring system 100 may include a plurality of monitoring node apparatuses. For example, the monitoring system 100 may include monitoring node apparatuses whose number is the same as the number of objects to be monitored. In addition, an individual node number is assigned to the monitoring node apparatus 104.

The monitoring node apparatus 104 includes a communication unit 110, and the monitoring gateway apparatus 106 includes a communication unit 111. The communication units 110 and 111 enable the monitoring node apparatus 104 and the monitoring gateway apparatus 106 to communicate with each other. The monitoring node apparatus 104 can transmit measurement data to the monitoring gateway apparatus 106 by using wireless communications or wire communications. The monitoring gateway apparatus 106 can collect information from the monitoring node apparatus 104.

The communication system between the communication units 110 and 111 may be a wireless communication system, such as the low power wide area (LPWA) or the wireless LAN, or may be a wire communication system, such as the Ethernet (registered trademark) or the Field Level Network. In another case, the communication units 110 and 111 may have both of a wireless communication function and a wire communication function, and may select and execute either the wireless communication function or the wire communication function. In the first embodiment, the communication units 110 and 111 have both of the wireless communication function and the wire communication function, and select and execute either the wireless communication function or the wire communication function.

The monitoring gateway apparatus 106 is disposed in an area in which the monitoring gateway apparatus 106 can communicate with the monitoring node apparatus 104. The measurement data measured and produced by the monitoring node apparatus 104 is collected in the monitoring gateway apparatus 106 via the communication units 110 and 111.

The monitoring gateway apparatus 106, the database 108, and the terminal 109 are connected to a network 107. The network 107 may be a dedicated network used in a factory, or may be a wide area network such as the Internet. The measurement data collected by the monitoring gateway apparatus 106 is stored in the database 108, which is one example of data storage devices, via the network 107. The terminal 109 is a computer that includes a display. The terminal 109 may include a speaker, if necessary.

Note that the monitoring gateway apparatus 106 may be implemented, as software of the database 108 or the terminal 109, in the database 108 or the terminal 109. In addition, the database 108 may be a storage device or a storage medium. In addition, the terminal 109 may be configured so that a user can check the data stored in the database 108, by operating the terminal 109. In addition, the terminal 109 may be configured so that a notifying means, such as an alert or an electronic mail, notifies a user of an abnormal state of the machine apparatus 101, via the terminal 109, if necessary.

Figure 2:
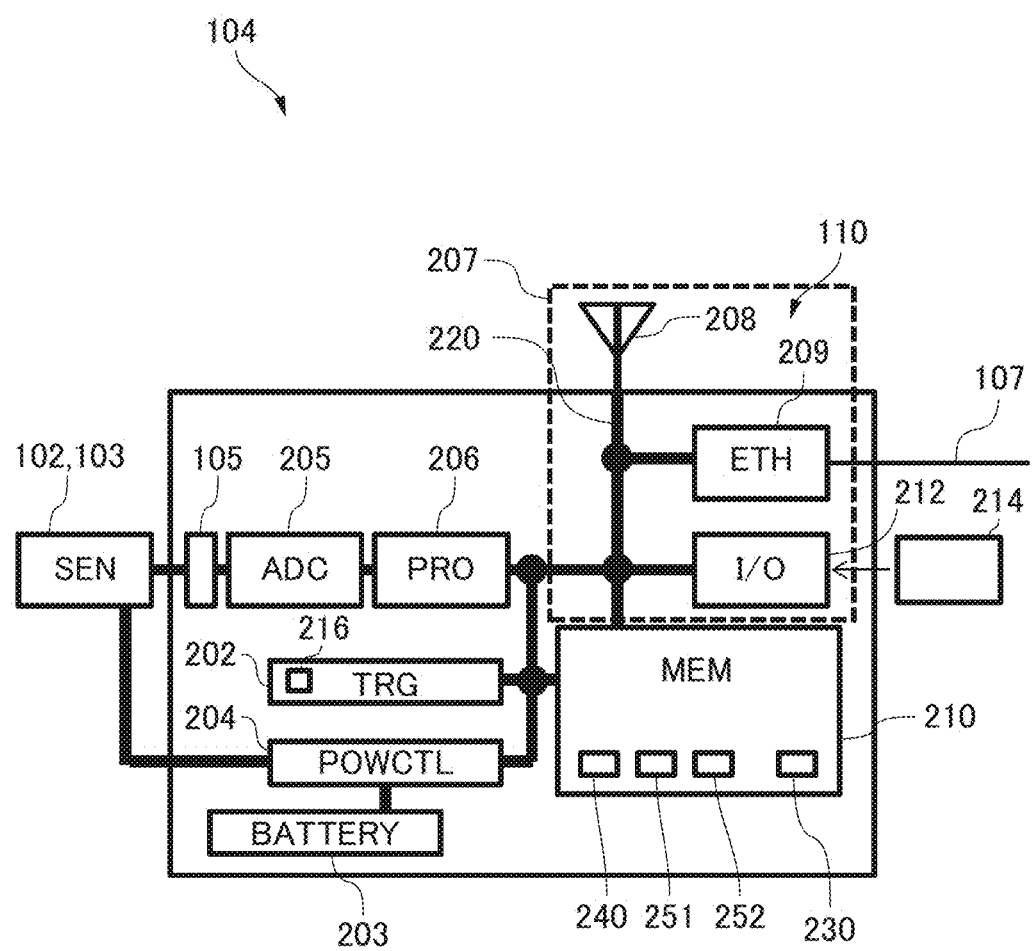
FIG. 2 is a block diagram of a monitoring node apparatus of the first embodiment.

FIG. 2 is a block diagram of the monitoring node apparatus 104 of the first embodiment. In the first embodiment, the monitoring node apparatus 104 is an information processing apparatus, or a computer. The monitoring node apparatus 104 includes the terminal portion 105, a trigger generation portion 202, an electric-power supply portion 204, a signal input portion 205 that is one example of AD conversion portions, a signal processing portion 206 that is one example of processing portions, an output portion 207, and a storage portion 210. These portions are connected with each other via a bus 220. The storage portion 210 is a storage device, such as an HDD or an SSD.

The electric-power supply portion 204 is connected with a battery 203. The battery 203 may be incorporated in the monitoring node apparatus 104, or may be detachably attached to the monitoring node apparatus 104. In another case, the battery 203 may be located outside the monitoring node apparatus 104. The electric-power supply portion 204 supplies electric power to the sensors 102 and 103 at any timings determined by a program. When supplied with electric power, the sensors 102 and 103 perform sensing and output analog signals, which are sensing signals obtained through the sensing.

The signal input portion 205 receives the analog signals from the sensors 102 and 103, and performs analog-digital (AD) conversion process for converting the analog signals to digital signals. Note that the signal input portion 205 may be included in each of the sensors 102 and 103. In the AD conversion process, sampling is performed on an analog signal sent from a specified channel terminal. The sampling is performed at a specified sampling frequency, by the specified number of samples, for producing the digital data.

The signal processing portion 206 serves also as a control portion, which controls the trigger generation portion 202, the electric-power supply portion 204, the signal input portion 205, the output portion 207, and the storage portion 210, as a whole. For example, the signal processing portion 206 is a CPU. The signal processing portion 206 can execute various processes by executing a control program 230, which is stored in the storage portion 210 and which is one example of programs. That is, the signal processing portion 206 can measure the state of the machine apparatus 101 by using the sensors 102 and 103 and executing a later-described measurement task.

The measurement task includes a task of AD conversion process that causes the signal input portion 205 to perform the AD conversion, a task of signal processing that processes the digital signal produced by the signal input portion 205 and that produces measurement data, and a task of output process that causes the output portion 207 to output the measurement data.

The signal processing includes a plurality of types of processing. Hereinafter, specific examples of the plurality of types of processing will be described. However, the present disclosure is not limited to the below-described types of processing. Note that the signal processing portion 206 may have functions to execute all of the plurality of below-described types of processing, or may have only necessary functions.

For example, the signal processing includes a relay process, an FFT process, a partial overall process, an envelope process, a frequency filter process, a differential process, an integral process, a wavelet process, an average value process, a standard deviation process, a maximum value process, and a minimum value process. In addition, the signal processing includes a peak-to-peak process, a peak hold process, an effective value process, a crest factor process, a form factor process, an impulse coefficient process, a margin coefficient process, and a machine-learning-model inference process. The signal processing portion 206 executes processes selected from the plurality of types of processing. If two or more types of processing are selected, the signal processing portion 206 executes the selected two or more types of processing, in a specified order.

Hereinafter, each type of processing will be described. The relay process delivers a digital signal, received by the signal processing portion 206, directly to the output portion 207. The FFT process decomposes a digital signal, received by the signal processing portion 206, into frequency components. The partial overall process determines a frequency range, and determines a total value of the FFT-processed frequency components in the frequency range. The envelop process performs an envelope process on a digital signal received by the signal processing portion 206. The frequency filter process sets a frequency, and causes a digital signal, received by the signal processing portion 206, to pass through a low-pass filter, a high-pass filter, or a band-pass filter for eliminating undesired signal components. The differential process differentiates a digital signal received by the signal processing portion 206. The integral process integrates a digital signal received by the signal processing portion 206. The wavelet process decomposes a digital signal, received by the signal processing portion 206, into frequency components and time components. The average value process determines an average value of a digital signal received by the signal processing portion 206. The standard deviation process determines a standard deviation of a digital signal received by the signal processing portion 206. The maximum value process determines a maximum value of a digital signal received by the signal processing portion 206. The minimum value process determines a minimum value of a digital signal received by the signal processing portion 206. The peak-to-peak process determines a difference between a maximum value and a minimum value of a digital signal received by the signal processing portion 206. The peak hold process determines a maximum value of a digital signal, received by the signal processing portion 206, in a predetermined period of time. The effective value process determines an effective value of a digital signal received by the signal processing portion 206. The crest factor process determines a crest factor of a digital signal, received by the signal processing portion 206, by dividing the maximum value of the digital signal by the effective value of the digital signal. The form factor process determines a form factor of a digital signal, received by the signal processing portion 206, by dividing the effective value of the digital signal by the average value of the digital signal. The impulse coefficient process determines an impulse coefficient of a digital signal, received by the signal processing portion 206, by dividing the maximum value of the digital signal by a value obtained by averaging absolute values of the digital signal. The margin coefficient process determines a margin coefficient of a digital signal, received by the signal processing portion 206, by dividing the maximum value of the digital signal by a value. The value is obtained by averaging square roots of the digital signal and calculating the square of the average value. The machine-learning-model inference process determines output, depending on a digital signal received by the signal processing portion 206 and a machine learning model. The machine learning model is produced by causing a computer to read learning data, analyze the data, and define rules for classification and identification. The produced machine learning model is implemented in the monitoring node apparatus 104 in advance.

As described above, the signal processing portion 206 executes a selected type of signal processing and produces measurement data. If the selected type of signal processing is the relay process, a digital signal received by the signal processing portion 206 is outputted to the output portion 207, as measurement data. Thus, the digital signal is identical to the measurement data. Although the digital signal is the same as the measurement data, the relay process is included in the process that produces measurement data.

The output portion 207 performs an output process in which the measurement data, produced by the signal processing portion 206, is outputted. That is, the output portion 207 outputs the measurement data by executing the output process. The output portion 207 includes a communication unit 110 and a general-purpose input/output unit 212. The communication unit 110 includes a communication module 208 that performs wireless communication, and a communication module 209 that performs wire communication. The communication module 208 outputs the measurement data wirelessly. In this case, the monitoring gateway apparatus 106 acquires measurement data from the monitoring node apparatus 104, via radio wave. The communication module 209 outputs the measurement data to the network 107. In this case, the monitoring gateway apparatus 106 acquires the measurement data from the monitoring node apparatus 104, via the network 107.

Note that although the output portion 207 can send and receive a signal in the configuration illustrate in FIG. 2, the output portion 207 may be configured so as to at least output the measurement data. In addition, one of the communication modules 208 and 209 may not be disposed, in accordance with a communication system used in the monitoring system 100.

The output portion 207 may output the measurement data to the storage portion 210. In addition, the output portion 207 may output the measurement data to an external apparatus (e.g., external storage) connected to the general-purpose input/output unit 212. In the output process, the output portion 207 also outputs node number information and task number information, together with the measurement data. The node number information is used for identifying the monitoring node apparatus 104 as an individual device. The task number information indicates the number of a measurement task executed by the signal processing portion 206. For example, the output portion 207 uses wireless communications or wire communications, and outputs the node number information, the task number information, and measurement data to the monitoring gateway apparatus 106 in this order.

The trigger generation portion 202 generates a trigger signal and sends the trigger signal to the signal processing portion 206 when an event occurs. That is, when an event occurs, the trigger generation portion 202 generates a trigger signal corresponding to the event and outputs the trigger signal. The trigger signal contains the task number information.

Note that the sentence "an event occurs" means that a condition to start measurement is satisfied. Hereinafter, the condition will be referred to as an event condition. In the present embodiment, the condition to start measurement, that is, the event condition is set in the trigger generation portion 202 by the signal processing portion 206. The event condition that is set by the signal processing portion 206 may be only one or two or more in number. In a case where a plurality of event conditions is set in the trigger generation portion 202 by the signal processing portion 206, the trigger generation portion 202 outputs trigger signals corresponding to respective event conditions (included in the plurality of event conditions) to the signal processing portion 206, in the order in which the respective event conditions have been satisfied.

The event condition that is set by the signal processing portion 206 includes a time condition, such as a measurement time interval or a measurement start time. Thus, the trigger generation portion 202 includes a timer 216 that is one example of time measuring portions. Note that although the timer 216 is included in the trigger generation portion 202 in the present embodiment, the present disclosure is not limited to this. For example, the timer 216 may be disposed in any portion of the monitoring node apparatus 104. The trigger generation portion 202 determines whether a time condition has been satisfied, depending on a time measured by the timer 216. In addition, in the present embodiment, the event condition that is set by the signal processing portion 206 also includes a condition other than the time condition. Examples of the condition other than the time condition includes the receipt of an external-trigger input signal, a change in state of the monitoring node apparatus 104, a call from another task of the monitoring node apparatus 104, a call from the monitoring gateway apparatus 106, and a call from another monitoring node apparatus.

If the event condition is the measurement time interval, events are generated at predetermined constant time intervals. If the event condition is the measurement time, an event is generated at a predetermined time. If a day of the week is specified, an event is generated at a time on the predetermined day of the week. If the event condition is the receipt of an external-trigger input signal, an event is generated when a signal from the general-purpose input/output unit 212 changes. If the event condition is a change in state of the monitoring node apparatus 104, an event is generated when the remaining battery level of the monitoring node apparatus 104 changes, or when a signal from a temperature sensor disposed in the monitoring node apparatus 104 changes. If the event condition is a call from another task of the monitoring node apparatus 104, an event is generated by the call from an output condition of the other task of the monitoring node apparatus 104 other than the measurement task. If the event condition is a call from the monitoring gateway apparatus 106, an event is generated when the monitoring node apparatus 104 receives a task execution command from the monitoring gateway apparatus 106. If the event condition is a call from another monitoring node apparatus, an event is generated when the monitoring node apparatus 104 is called by the output process of the other monitoring node device.

The AD conversion process of the signal input portion 205, the signal processing of the signal processing portion 206, and the output process of the output portion 207 are associated with each of the plurality of event conditions; and are stored in the task table 240, as a measurement task. The task table 240 is stored in the storage portion 210, for example. The signal processing portion 206 refers to the task table 240, and performs the measurement by using a sensor specified in a measurement task defined in the task table 240. Note that although the task table 240 is suitably stored in the storage portion 210 disposed in the monitoring node apparatus 104, the present disclosure is not limited to this. For example, the task table 240 may be stored in an external storage device, which is located outside the monitoring node apparatus 104. The information stored in the task table 240 is set by a person, such as a worker or a user.

The general-purpose input/output unit 212 can be connected with an external apparatus. As one example, the external apparatus may be a recording medium 214 in which a control program 230 is stored; and the general-purpose input/output unit 212 may be connected with the recording medium 214. The recording medium 214 is a computer-readable non-transitory recording medium that stores the control program 230. The control program 230 stored in the recording medium 214 can be stored in the storage portion 210, via the general-purpose input/output unit 212. The recording medium 214 may be a recording disk (e.g., CD-ROM or DVD-ROM), such as a magnetic disk or an optical disk, or a storage device (e.g., SD card) such as a flash memory.

FIG. 3 is a diagram illustrating one example of the task table 240 of the first embodiment. The task table 240 includes a plurality of pieces of task number information $301_1$, $301_2$, and $301_3$; a plurality of event conditions $302_1$, $302_2$, and $302_3$; a plurality of pieces of priority information $303_1$, $303_2$, and $303_3$; and a plurality of measurement tasks $310_1$, $310_2$, and $310_3$. In the task table 240, the task number information $301_1$, the event condition $302_1$, the priority information $303_1$, and the measurement task $310_1$ are associated with each other. In the task table 240, the task number information $301_2$, the event condition $302_2$, the priority information $303_2$, and the measurement task $310_2$ are associated with each other. In the task table 240, the task number information $301_3$, the event condition $302_3$, the priority information $303_3$, and the measurement task $310_3$ are associated with each other. That is, the plurality of measurement tasks $310_1$ to $310_3$ are respectively assigned with the pieces of priority information $303_1$ to $303_3$.

The pieces of task number information $301_1$ to $301_3$ are information expressed by numbers, such as 1, 2, and 3. The pieces of priority information $303_1$ to $303_3$ are information on the priority expressed by numbers, such as 1, 2, and 3. In the example of FIG. 3, a smaller number indicates a higher priority. Note that since the above-described expression is one example, the present disclosure is not limited to this. For example, a larger number may indicate a higher priority. Note that a measurement task with urgency is assigned with a higher priority.

Each of the measurement tasks $310_1$ to $310_3$ includes three tasks. The measurement task $310_1$ includes a task $304_1$, a task $305_1$, and a task $306_1$. The measurement task $310_2$ includes a task $304_2$, a task $305_2$, and a task $306_2$. The measurement task $310_3$ includes a task $304_3$, a task $305_3$, and a task $306_3$. Each of the tasks $304_1$ to $304_3$ is a first task in which the signal input portion 205 executes the AD conversion process. Each of the tasks $305_1$ to $305_3$ is a second task in which the signal processing portion 206 performs the signal processing on a digital signal and produces measurement data. Each of the tasks $306_1$ to $306_3$ is a third task in which the output portion 207 executes the output process that outputs the measurement data.

The task table 240 includes a plurality of items 301 to 306. The item 301 is an item in which the pieces of task number information $301_1$ to $301_3$ are registered. The item 302 is an item in which the event conditions $302_1$ to $302_3$ are registered. The item 303 is an item in which the pieces of priority information $303_1$ to $303_3$ are registered. The items 304 to 306 are items in which the measurement tasks $310_1$ to $310_3$ are registered. Specifically, the item 304 is an item in which the tasks $304_1$ to $304_3$ of the AD conversion process performed by the signal input portion 205 are registered. The item 305 is an item in which the tasks (types of processing) $305_1$ to $305_3$ of the signal processing, performed by the signal processing portion 206, are registered. The item 306 is an item in which the tasks (i.e., way of outputting) $306_1$ to $306_3$ of the output process, performed by the output portion 207, are registered.

Thus, in the task table 240, the plurality of measurement tasks corresponding to the plurality of event conditions are registered in advance, together with the task number information and the priority information.

Figure 4:
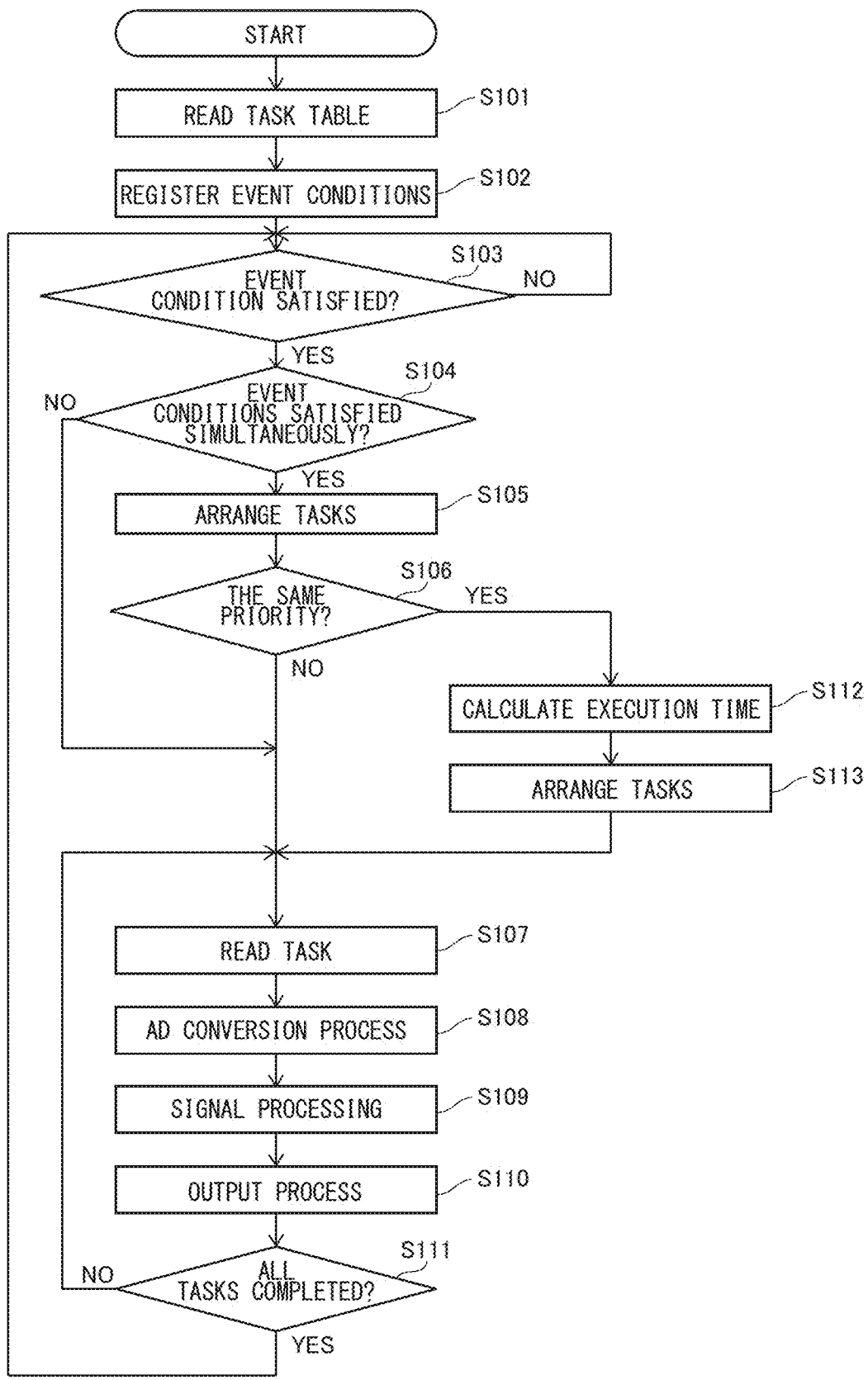
FIG. 4 is a flowchart of an information processing method of the first embodiment.

FIG. 4 is a flowchart illustrating a procedure of processes in which the monitoring node apparatus 104 of the first embodiment monitors the machine apparatus 101, that is, a procedure of the information processing method. When the power of the monitoring node apparatus 104 is turned on, that is, when the monitoring node apparatus 104 is started, the monitoring node apparatus 104 starts a control flow for monitoring the machine apparatus 101. In the present embodiment, the signal processing portion 206 refers to the task table 240, and executes a measurement task corresponding to an event condition that has been satisfied.

First, when the monitoring node apparatus 104 is started, the signal processing portion 206 reads the task table 240 stored in advance in the storage portion 210 (S101).

The signal processing portion 206 associates the plurality of event conditions $302_1$ to $302_3$ registered in the task table 240, with the pieces of task number information $301_1$ to $301_3$; and registers the pieces of task number information $301_1$ to $301_3$ and the event conditions $302_1$ to $302_3$ in the trigger generation portion 202 (S102). If an event condition of the plurality of event conditions $302_1$ to $302_3$ has been satisfied, then the trigger generation portion 202 outputs a trigger signal corresponding to the event condition. The trigger signal outputted by the trigger generation portion 202 contains a piece of task number information corresponding to the event condition that has been satisfied, so that the signal processing portion 206 can determine which event condition has been satisfied.

The signal processing portion 206 determines whether an event condition of the plurality of event conditions $302_1$ to $302_3$, which are read in Step S101 by the signal processing portion 206, has been satisfied, that is, whether the signal processing portion 206 has received a trigger signal from the trigger generation portion 202 (S103). If no event condition has been satisfied, that is, if the signal processing portion 206 has not received a trigger signal from the trigger generation portion 202 (S103: NO), then the signal processing portion 206 repeats the determination process of Step S103. That is, the signal processing portion 206 waits for a trigger signal.

If the signal processing portion 206 receives a trigger signal from the trigger generation portion 202, that is, if an event condition has been satisfied (S103: YES), then the signal processing portion 206 determines whether two or more event conditions have been satisfied simultaneously (S104). Hereinafter, the two or more event conditions are referred to as N number of event conditions. The number N is an integer that is two or more.

If the N number of event conditions have not been satisfied simultaneously (S104: NO), then the signal processing portion 206 proceeds to Step S107. In this case, the number of event conditions that have been satisfied is one. The signal processing portion 206 reads a measurement task corresponding to the one event condition, which has been satisfied, from the task table 240 (S107). For example, if the event condition $302_1$ has been satisfied, then the signal processing portion 206 reads the measurement task $310_1$ corresponding to the event condition $302_1$. The measurement task $310_1$ includes the task $304_1$ of AD conversion process executed by the signal input portion 205, the task $305_1$ of signal processing executed by the signal processing portion 206, and the task $306_1$ of output process executed by the output portion 207. Hereinafter, the description will be made, as an example, for a case where the task that is read by the signal processing portion 206 in Step S107 is the measurement task $310_1$. Note that even if a measurement task corresponding to an event condition that has been satisfied is not the measurement task $310_1$, the signal processing portion 206 performs processing in the same manner.

The signal processing portion 206 instructs the signal input portion 205 to execute the task $304_1$. Then the signal input portion 205 executes the AD conversion process in accordance with the task $304_1$ (S108). In this task, the signal input portion 205 converts an analog signal sent from a sensor, to a digital signal; and outputs the digital signal to the signal processing portion 206. The signal processing portion 206 receives the digital signal from the signal input portion 205, and performs the signal processing on the digital signal in accordance with the task $305_1$ (S109). The signal processing portion 206 outputs the measurement data to the output portion 207, and instructs the output portion 207 to execute the task $306_1$. The output portion 207 executes the output process in accordance with the task $306_1$ (S110). In this task, the output portion 207 outputs the measurement data.

The signal processing portion 206 determines whether the signal processing portion 206 has executed all the measurement tasks (S111). In this case, since the number of measurement tasks is one, the signal processing portion 206 has executed all the measurement tasks (S111: YES). Thus, the signal processing portion 206 returns to Step S103.

If the N number of event conditions have been satisfied simultaneously in Step S104 (S104: YES), then the signal processing portion 206 executes a priority process in Step S105 to S113. In the priority process, the N number of measurement tasks corresponding to the N number of event conditions are executed in order of priority.

In the present embodiment, the trigger generation portion 202 and the signal processing portion 206 performs packet communication with each other, in which a group of information is collectively transmitted and received. That is, a packet is used as the trigger signal. If the N number of event conditions have been satisfied simultaneously, the trigger generation portion 202 outputs N pieces of task number information corresponding to the N number of event conditions, as a packet. In this case, the trigger generation portion 202 may output a single packet or a plurality of divided packets. Through this communication, the signal processing portion 206 can acquire the pieces of the task number information corresponding to the N number of event conditions, which have been satisfied simultaneously, from the trigger generation portion 202.

Note that in Step S104, it is preferable that the signal processing portion 206 determines whether the N number of event conditions have been satisfied simultaneously. However, the signal processing portion 206 may determines whether the N number of event conditions have been satisfied substantially simultaneously, not simultaneously. For example, there may be a case in which a plurality of event conditions has been successively satisfied. In this case, the plurality of event conditions has not been simultaneously satisfied. However, in some cases, it is reasonable that the plurality of event condition that has been satisfied substantially simultaneously are regarded as event conditions that have been satisfied simultaneously. Note that the plurality of event conditions that has been satisfied substantially simultaneously are event conditions which have been successively satisfied, and in which a time interval between the first event condition and the last event condition of the plurality of event conditions is equal to or smaller than a predetermined time. For example, the predetermined time is 0.5 seconds.

That is, if an event condition has been satisfied, the trigger generation portion 202 starts to measure time at a timing at which the event condition is satisfied, and waits until the predetermined time (e.g., 0.5 seconds) has elapsed. If another event condition is satisfied while the trigger generation portion 202 is waiting, the trigger generation portion 202 puts in a packet a piece of task number information corresponding to the event condition that was satisfied earlier and a piece of task number information corresponding to the event condition that has been satisfied later. Then the trigger generation portion 202 outputs the packet to the signal processing portion 206. With this operation, the signal processing portion 206 can determine that the N number of event conditions have been satisfied substantially simultaneously. In this manner, a wait time that is the predetermined time is set in the trigger generation portion 202, so that the trigger generation portion 202 can notify the signal processing portion 206 of the information on the N number of event conditions that have been satisfied substantially simultaneously. Note that if the simultaneity is focused on, the wait time may not be set in the trigger generation portion 202. In this case, since the wait time is not set in the trigger generation portion 202, the trigger generation portion 202 can notify the signal processing portion 206 of the information indicating that the N number of event conditions have been satisfied simultaneously.

If a plurality (N number) of event conditions have been satisfied simultaneously (or substantially simultaneously) in Step S104 (S104: YES), then the signal processing portion 206 arranges the N number of measurement tasks in order of priority (S105). That is, the signal processing portion 206 determines the order of execution of the N number of measurement tasks.

Then the signal processing portion 206 determines whether the N number of measurement tasks include at least two measurement tasks having an identical priority (S106). Hereinafter, the at least two measurement tasks are referred to as M number of measurement tasks. The number M is an integer that is two or more and smaller than the number N.

If the N number of measurement tasks do not include the M number of measurement tasks having an identical priority (S106: NO), then the signal processing portion 206 proceeds to Step S107. Then the signal processing portion 206 reads the N number of measurement tasks in the order of the arrangement, and executes each measurement task (S107 to S111). If the signal processing portion 206 has executed all the measurement tasks (S111: YES), then the signal processing portion 206 returns to Step S103. With these operations, if the N number of event conditions have been satisfied simultaneously (or substantially simultaneously), the signal processing portion 206 executes the N number of measurement tasks corresponding to the N number of event conditions, in order of priority.

If the N number of measurement tasks include the M number of measurement tasks having an identical priority (S106: YES), then the signal processing portion 206 proceeds to Step S112.

The signal processing portion 206 estimates or calculates an execution time of each of the M number of measurement tasks having an identical priority (S112). Specifically, the signal processing portion 206 calculates the execution time of each measurement task, based on the number of samples, a sampling frequency, a proportionality constant K, and a proportionality constant L, which will be described later. The estimating calculation is performed before the M number of measurement tasks are executed in the following steps S107 to S111. The signal processing portion 206 arranges the M number of measurement tasks in increasing order of execution time (S113).

Then the signal processing portion 206 reads the N number of measurement tasks in the order of the arrangement, and executes each measurement task (S107 to S111). If the signal processing portion 206 has executed all the measurement tasks (S111: YES), then the signal processing portion 206 returns to Step S103. As described above, if the N number of measurement tasks include the M number of measurement tasks having an identical priority, the signal processing portion 206 executes the M number of measurement tasks in increasing order of execution time when executing the N number of measurement tasks.

The above-described information processing method will be described by using a specific example of the task table 240 illustrated in FIG. 3. The timer 216 of the trigger generation portion 202 starts to measure time at a point of time at which the power of the monitoring node apparatus 104 is turned on, or at a point of time at which the monitoring node apparatus 104 is reset.

The event condition $302_1$ is satisfied at time intervals of 60 minutes, that is, every time 60 minutes has elapsed. Hereinafter, the description will be made for a case where only the event condition $302_1$ has been satisfied. If the event condition $302_1$ has been satisfied (S103: YES), a trigger signal that contains the task number information $301_1$, which is the information of "1", is sent from the trigger generation portion 202 to the signal processing portion 206. The signal processing portion 206 executes the measurement task $310_1$ corresponding to the task number information $301_1$. The measurement task $310_1$ includes the task $304_1$, the task $305_1$, and the task $306_1$.

First, the signal processing portion 206 reads the measurement task $310_1$ from the task table 240 (S107), and instructs the signal input portion 205 to execute the task $304_1$. In the task $304_1$, the signal input portion 205 converts an analog signal sent from the channel terminal ch1, into a digital signal (S108). In the conversion, the sampling frequency is 10 kHz, the input range is 0 to 5 V, the number of samples is 5,000, and the amplification factor is 50.

Then the signal processing portion 206 performs signal processing on the digital signal, in the task $305_1$. Specifically, the signal processing portion 206 performs the average value process on the digital signal (S109). In this example, the average value is equal to or smaller than a threshold value of 50.

The signal processing portion 206 instructs the output portion 207 to execute the task $306_1$. In the task $306_1$, a setting of "wireless" is selected. Thus, the communication module 208 of the output portion 207 transmits the measurement data to the monitoring gateway apparatus 106 by using wireless communications (S110).

Next, the description will be made for a case where the event condition $302_1$ and the event condition $302_2$ have been satisfied simultaneously. In the description, a smaller number indicates a higher priority. The event condition $302_2$ is satisfied at time intervals of 24 hours, that is, every time 24 hours has elapsed.

If the event condition $302_1$ and the event condition $302_2$ have been satisfied simultaneously, a trigger signal that contains the task number information $301_1$, which is the information of "1", and the task number information $301_2$, which is the information of "2", are sent from the trigger generation portion 202 to the signal processing portion 206.

Since the two event conditions $302_1$ and $302_2$ have been satisfied simultaneously (S104: YES), the signal processing portion 206 determines the priority by referring to the task table 240. The priority of the event condition $302_1$ is 2, and the priority of the event condition $302_2$ is 1. Thus, the priority of the event condition $302_2$ is higher than the priority of the event condition $302_1$. Thus, the signal processing portion 206 executes the two measurement tasks $310_1$ and $310_2$ in order of priority, as a priority process. That is, the signal processing portion 206 executes the measurement task $310_2$ and the measurement task $310_1$ in this order. The measurement task $310_2$ includes the task $304_2$, the task $305_2$, and the task $306_2$.

First, the signal processing portion 206 reads the measurement task $310_2$ from the task table 240 (S107), and instructs the signal input portion 205 to execute the task $304_2$. In the task $304_2$, the signal input portion 205 converts an analog signal sent from the channel terminal ch2, into a digital signal (S108). In the conversion, the sampling frequency is 54 kHz, the input range is 0 to 5 V, the number of samples is 10,000, and the amplification factor is 50.

Then the signal processing portion 206 performs signal processing on the digital signal, in the task $305_2$. Specifically, the signal processing portion 206 performs the FFT process on the digital signal (S109).

Then the signal processing portion 206 instructs the output portion 207 to execute the task $306_2$. In the task $306_2$, a setting of "wire" is selected. Thus, the communication module 209 of the output portion 207 transmits the measurement data to the monitoring gateway apparatus 106 by using wire communications (S110).

After executing the measurement task $310_2$, the signal processing portion 206 executes the measurement task $310_1$ (S107 to S110). Since the measurement task $310_1$ has been described above, the description thereof will be omitted. In this manner, the measurement tasks are executed in order of priority.

Next, the description will be made for a case where only the event condition $302_1$ has been satisfied first and then the event conditions $302_2$ and $302_3$ have been satisfied simultaneously. The priority of the measurement task $310_2$ corresponding to the event condition $302_2$ is identical to the priority of the measurement task $310_3$ corresponding to the event condition $302_3$.

First, the signal processing portion 206 executes the measurement task $310_1$ corresponding to the event condition $302_1$. Assume that the machine apparatus 101, which is being monitored, has been in an abnormal state and the average value has exceeded the threshold value of 50. If a measurement result obtained through the measurement corresponding to the task number of 1 exceeds the constant threshold value, more detailed measurement corresponding to the task number of 3 is performed. In addition, assume that when the event condition $302_3$, which is a call event and corresponds to the task number of 3, has been satisfied, the event condition $302_2$, which is a 24-hour interval event and corresponds to the task number of 2, has been satisfied simultaneously.

If the event condition $302_2$ and the event condition $302_3$ have been satisfied simultaneously, a trigger signal that contains the task number information $301_2$ (i.e., the number 2) and the task number information $301_3$ (i.e., the number 3) is sent from the trigger generation portion 202 to the signal processing portion 206.

Since the two event conditions $302_2$ and $302_3$ have been satisfied simultaneously (S104: YES), the signal processing portion 206 determines the priority by referring to the task table 240. The priority of the measurement task $310_2$ corresponding to the event condition $302_2$ is 1, and the priority of the measurement task $310_3$ corresponding to the event condition $302_3$ is 1. Thus, the priority of the measurement task $310_2$ is identical to the priority of the measurement task $310_3$ (S106: YES). Thus, the signal processing portion 206 calculates an execution time of each of the measurement tasks $310_2$ and $310_3$ (S112).

Figure 5:
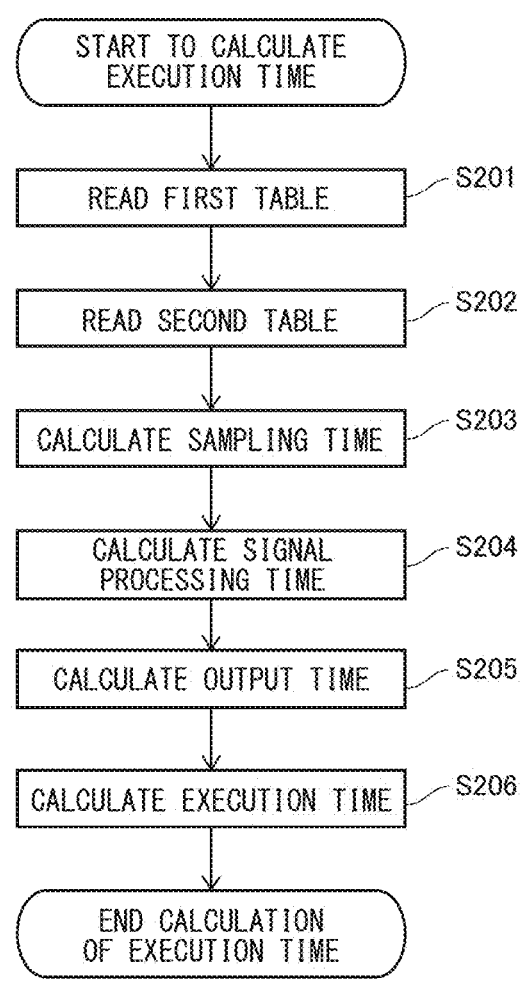
FIG. 5 is a flowchart illustrating a processing method of the first embodiment that calculates an execution time.

Hereinafter, a specific example that is preferable to calculate the execution time in Step S112 will be described. FIG. 5 is a flowchart illustrating a processing method of the first embodiment that calculates an execution time. FIG. 6A is a diagram illustrating one example of a table 251 of the first embodiment, and FIG. 6B is a diagram illustrating one example of a table 252 of the first embodiment. The tables 251 and 252 are stored in the storage portion 210 illustrated in FIG. 2. The table 251 is a first table, and the table 252 is a second table. The information stored in the tables 251 and 252 is set by a person, such as a worker or a user.

The execution time required to execute the measurement task $310_2$ includes a sampling time required to execute the task $304_2$, a signal processing time required to execute the task $305_2$, and an output time required to execute the task $306_2$. The execution time required to execute the measurement task $310_3$ includes a sampling time required to execute the task $304_3$, a signal processing time required to execute the task $305_3$, and an output time required to execute the task $306_3$. The sampling time is a first time, the signal processing time is a second time, and the output time is a third time. In the present embodiment, the execution time is the total of the sampling time, the signal processing time, and the output time.

The table 251 is a table in which a type of signal processing performed by the signal processing portion 206 is associated with a corresponding proportionality constant K The proportionality constant K is a first proportionality constant. The table 252 is a table in which a way of outputting in the output process performed by the output portion 207 is associated with a corresponding proportionality constant L. The proportionality constant L is a second proportionality constant.

First, the signal processing portion 206 reads the tables 251 and 252 from the storage portion 210 (S201, S202). Then the signal processing portion 206 determines a sampling time of each of the measurement tasks $310_2$ and $310_3$, based on a sampling frequency and the number of samples that the signal input portion 205 uses for performing the AD conversion process (S203).

The sampling time is a time required to sample a signal. The signal processing portion 206 calculates a sampling time corresponding to each of the measurement tasks $310_2$ and $310_3$, by dividing the number of samples by the sampling frequency. The number of samples and the sampling frequency for the measurement task $310_2$ are registered in the task $304_2$, and the number of samples and the sampling frequency for the measurement task $310_3$ are registered in the task $304_3$. In the example illustrated in FIG. 3, the number of samples is 10,000 in both of the tasks $304_2$ and $304_3$, and the sampling frequency is 54 kHz in both of the tasks $304_2$ and $304_3$. Thus, the sampling time corresponding to each of the measurement tasks $310_2$ and $310_3$ can be calculated by dividing the number of samples by the sampling frequency, and estimated as 0.185 seconds (=10,000/ 54 kHz).

Then the signal processing portion 206 determines a signal processing time, based on the number of samples that the signal input portion 205 uses for performing the AD conversion process, and on the proportionality constant K that corresponds to a type of signal processing (S204). In the present embodiment, the signal processing portion 206 determines the signal processing time by referring to the table 251.

The signal processing time is a time required to perform a signal processing on a digital signal sent from the signal input portion 205, and is proportional to the number of samples. Thus, the proportionality constant is denoted by K. The proportionality constant K has a value varied depending on a type of signal processing. Thus, the proportionality constant K is set for each type of processing. In addition, if a plurality of monitoring node apparatuses is used, the proportionality constant K is set for each monitoring node apparatus. The relationship between a type of processing and the proportionality constant K is defined in the table 251 illustrated in FIG. 6A.

In Step S204, the signal processing portion 206 calculates a signal processing time of each of the measurement tasks $310_2$ and $310_3$, by multiplying the number of samples by the proportionality constant K.

The number of samples for the measurement task $310_2$ is registered in the task $304_2$, and the number of samples for the measurement task $310_3$ is registered in the task $304_3$. In the example illustrated in FIG. 3, the number of samples is 10,000 in both of the tasks $304_2$ and $304_3$.

The type of signal processing performed in the measurement task $310_2$ is the FFT process. In the table 251, the proportionality constant K associated with the FFT process is $2\times10^{-4}$. Thus, the signal processing time corresponding to the measurement task $310_2$ can be calculated by multiplying the number of samples by the proportionality constant K, and estimated as 2 seconds (=$10,000 \times 2\times10^{-4}$).

The type of signal processing performed in the measurement task $310_3$ is the average value process. In the table 251, the proportionality constant K associated with the average value process is $2\times10^{-5}$. Thus, the signal processing time corresponding to the measurement task $310_3$ can be calculated by multiplying the number of samples by the proportionality constant K, and estimated as 0.2 seconds (=$10,000 \times 2\times10^{-5}$).

Then the signal processing portion 206 determines an output time, based on the number of samples that the signal input portion 205 uses for performing the AD conversion process, and on the proportionality constant L that corresponds to a way of outputting of the output portion 207 (S205). In the present embodiment, the signal processing portion 206 determines the output time by referring to the table 252.

The output time is a time required to perform the communication, and is proportional to the number of samples. Thus, the proportionality constant is denoted by L. The proportionality constant L has a value varied depending on a way in which the output portion 207 outputs the measurement data. That is, the output time has a value varied depending on whether the measurement data is outputted wirelessly, via wire, or to an external storage for storing the measurement data in the external storage. Thus, the proportionality constant L is set for each way of outputting. In addition, if a plurality of monitoring node apparatuses is used, the proportionality constant L is set for each monitoring node apparatus. The relationship between a way of outputting and the proportionality constant L is defined in the table 252 illustrated in FIG. 6B.

In Step S205, the signal processing portion 206 calculates an output time corresponding to each of the measurement tasks $310_2$ and $310_3$, by multiplying the number of samples by the proportionality constant L.

The number of samples for the measurement task $310_2$ is registered in the task $304_2$, and the number of samples for the measurement task $310_3$ is registered in the task $304_3$. In the example illustrated in FIG. 3, the number of samples is 10,000 in both of the tasks $304_2$ and $304_3$.

The way of outputting in the measurement task $310_2$ is wire communication. In the table 252, the proportionality constant L associated with the wire communication is $2\times10^{-5}$. Thus, the output time corresponding to the measurement task $310_2$ can be calculated by multiplying the number of samples by the proportionality constant L, and estimated as 0.2 seconds ($=10,000\times2\times10^{-5}$).

The way of outputting in the measurement task $310_3$ is wireless communication. In the table 252, the proportionality constant L associated with the wireless communication is $1\times10^{-4}$. Thus, the output time corresponding to the measurement task $310_3$ can be calculated by multiplying the number of samples by the proportionality constant L, and estimated as 1 second ($=10,000\times1\times10^{-4}$).

Consequently, the execution time of the measurement task $310_2$ is 2.385 seconds ($=0.185+2+0.2$), and the execution time of the measurement task $310_3$ is 1.385 seconds ($=0.185+0.2+1$). With this calculation, the signal processing portion 206 determines the execution time of the measurement tasks $310_2$ and $310_3$ (S206). In this example, the execution time of the measurement task $310_3$ is shorter than the execution time of the measurement task $310_2$. Thus, the measurement task $310_3$ having the shorter execution time is executed earlier than the measurement task $310_2$.

Note that the description has been made for the case where the execution time is calculated in Step S112, which is executed after Step S106 is determined as YES, the present disclosure is not limited to this. For example, the execution time may be calculated at a timing at which the task table 240 and the tables 251 and 252 are stored in the monitoring node apparatus 104.

As described above, in the first embodiment, even if the N number of event conditions have been satisfied simultaneously, the delay of start of an urgent measurement task or a measurement task with high priority can be prevented because the N number of measurement tasks are executed in order of priority. In addition, if the N number of measurement tasks include the M number of measurement tasks having an identical priority, the M number of measurement tasks are executed in increasing order of execution time. Thus, when the M number of measurement tasks are executed, a wait time can be shortened. For example, if the M number of measurement tasks include a measurement task that is required to be executed in a predetermined cycle, the wait time of the measurement task can be shortened. Therefore, in the first embodiment, the state of the machine apparatus 101 can be measured at appropriate timings.

Second Embodiment

Next, an information processing method of a second embodiment will be described. Note that since the overall configuration of a production facility of the second embodiment is the same as that of the production facility 1000 of the first embodiment, the description thereof will be omitted. The second embodiment differs from the first embodiment in part of the information processing method.

In the above-described first embodiment, the priority of each measurement task is registered in advance in the task table 240. Specifically, the priority corresponding to each of the plurality of measurement tasks is registered in the task table 240 by a person, such as a worker or a user. In the second embodiment, however, the priority of each measurement task is automatically determined by the signal processing portion 206. Hereinafter, features of the second embodiment different from those of the first embodiment will be described in detail, and the description of the same features will be omitted.

FIG. 7 is a diagram illustrating a priority table 260 that the information processing method of the second embodiment uses. In the task table 240 illustrated in FIG. 3, the plurality of measurement tasks $310_1$ to $310_3$ corresponding to the plurality of pieces of task number information $301_1$ to $301_3$ are registered. In the second embodiment, however, in the task table 240 illustrated in FIG. 3, the item 303 that indicates the priority does not exist, or otherwise, the priority is not registered in the item 303 even if the item 303 exits.

If the N number of event conditions have been satisfied simultaneously (S104 of FIG. 4: YES), the signal processing portion 206 executes the N number of measurement tasks corresponding to the N number of event conditions in order of priority. Thus, in Step S105 of FIG. 4, the signal processing portion 206 refers to the priority table 260 illustrated in FIG. 7, and assigns priorities to the N number of measurement tasks. That is, in Step S105, the signal processing portion 206 refers to the priority table 260, and determines priorities of the N number of measurement tasks, which correspond to the event conditions that have been satisfied simultaneously. Then the signal processing portion 206 arranges the N number of measurement tasks in order of priority. The priority table 260 is stored in advance in the storage portion 210 illustrated in FIG. 2. The information stored in the priority table 260 is set by a person, such as a worker or a user.

In the priority table 260, a priority is assigned to each type of signal processing performed by the signal processing portion 206. That is, in the priority table 260, a type of signal processing is associated with a corresponding priority.

For example, as illustrated in FIG. 7, a priority of 1 is assigned to processes, such as the maximum value process, the minimum value process, and the average value process, that require less time for performing signal processing and communication. A priority of 3 is assigned to processes, such as the FFT process, that require more time for performing signal processing and communication. With the priorities registered in this manner, if the N number of event conditions have been satisfied simultaneously, a measurement task that requires less process time is executed prior to a measurement task that requires more process time. As a result, the delay of start of a following measurement task can be prevented. That is, the wait time of the following measurement task can be prevented from being extended.

The format of the priority table 260 is not limited to a particular format, but preferably is the CSV format. In this manner, even if the priority is not registered in advance in the task table 240, the signal processing portion 206 can determine the order of execution of the N number of measurement tasks by referring to the priority table 260. Thus, since the signal processing portion 206 automatically determines the priority of each measurement task, the work of a person to assign a priority to each measurement task can be eliminated and the work load of the person can be reduced.

Third Embodiment

Next, an information processing method of a third embodiment will be described. Note that since the overall configuration of a production facility of the third embodiment is the same as that of the production facility 1000 of the first embodiment, the description thereof will be omitted. The third embodiment differs from the first embodiment in part of the information processing method.

In the above-described first embodiment, the proportionality constant K is registered in advance in the table 251. That is, the proportionality constant K is registered in the table 251 by a person, such as a worker or a user. In the third embodiment, however, the proportionality constant K is automatically registered by the signal processing portion 206. Hereinafter, features of the third embodiment different from those of the first embodiment will be described in detail, and the description of the same features will be omitted.

Figure 8:
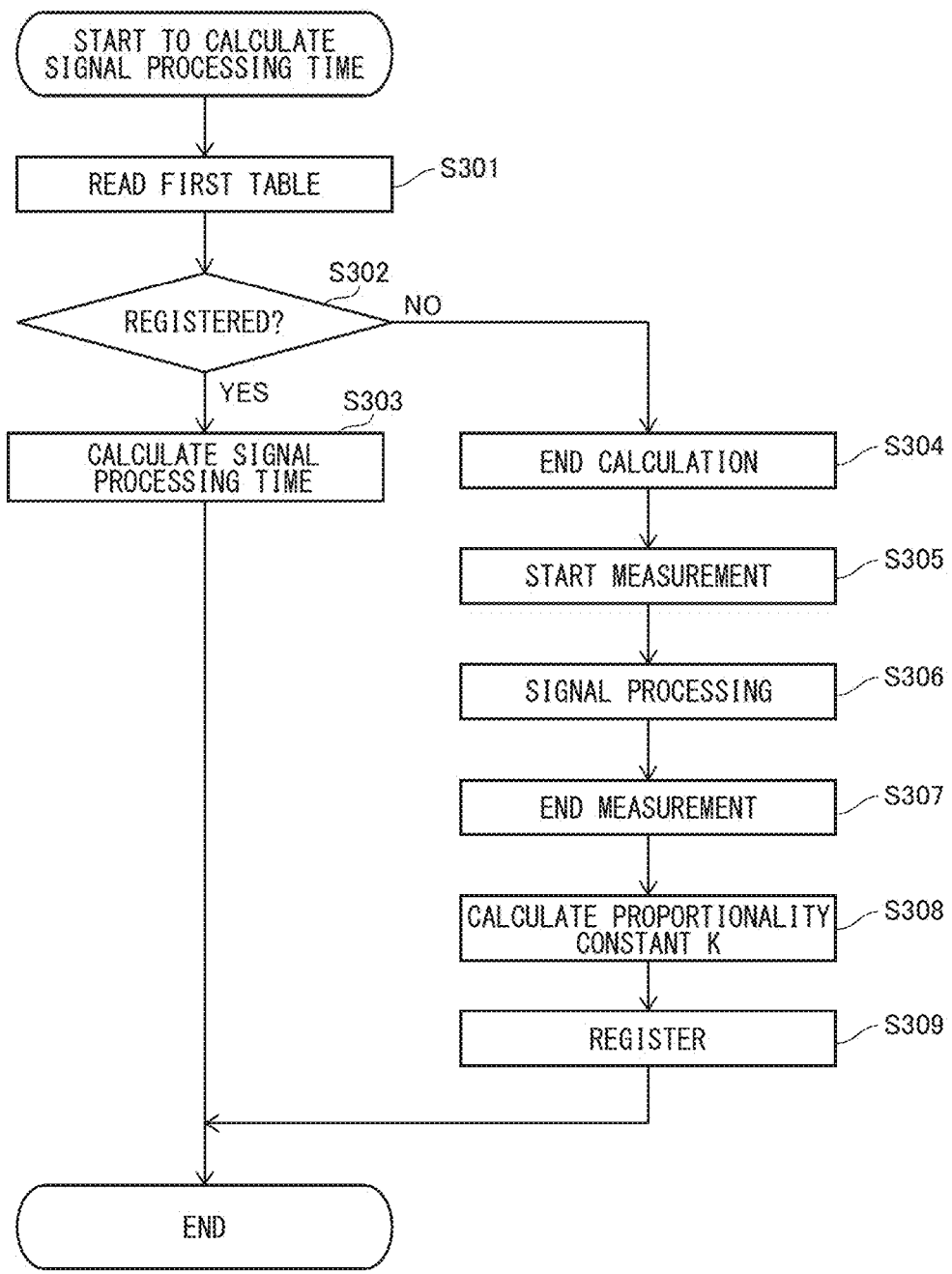
FIG. 8 is a flowchart illustrating a method of a third embodiment that determines a signal processing time.

When the signal processing portion 206 calculates an execution time in Step S112 of FIG. 4, the signal processing portion 206 determines the signal processing time, which is the second time included in the execution time. FIG. 8 is a flowchart illustrating a method of the third embodiment that determines the signal processing time.

First, the signal processing portion 206 reads the table 251 of the proportionality constant K from the storage portion 210 (S301). The table 251 is the first table. Then the signal processing portion 206 determines whether a proportionality constant K corresponding to a type of signal processing, which is included in each of the M number of measurement tasks of the task table 240, is registered in the table 251 (S302). If the proportionality constant K is registered in the table 251 (S302: YES), then the signal processing portion 206 refers to the table 251, and calculates a signal processing time for each of the M number of measurement tasks (S303).

If at least one proportionality constant K is not registered in the table 251 (S302: NO), then the signal processing portion 206 sets a default value to the signal processing time of a type of signal processing for which the proportionality constant K is not registered, then ends the calculation process (S304), and then executes Step S113 of FIG. 4 and the following processes. When the signal processing portion 206 actually executes, in Step S109, the type of signal processing, for which the proportionality constant K is not registered, the signal processing portion 206 starts to measure an actual signal processing time of the signal processing (S305). Then the signal processing portion 206 executes the signal processing (S306), and ends the measurement of the signal processing time when the signal processing is completed (S307). With this operation, the actual signal processing time of the type of signal processing is measured.

The signal processing portion 206 calculates the proportionality constant K of the type of signal processing by dividing the measured signal processing time by the number of samples that is set in the measurement task (S308). Then the signal processing portion 206 registers the calculated proportionality constant K in the table 251, associating the proportionality constant K with the type of signal processing (S309). As described above, the signal processing portion 206 registers the proportionality constant K, which is based on the actually measured signal processing time, in the table 251, associating the proportionality constant K with the type of signal processing.

By performing the above-described processes, a proportionality constant K that has not been registered in the table 251 is registered in the table 251. As a result, the work of a person, such as a worker or a user, to register the proportionality constant K in the table 251 can be eliminated, and the work load of the person can be reduced.

Fourth Embodiment

Next, an information processing method of a fourth embodiment will be described. Note that since the overall configuration of a production facility of the fourth embodiment is the same as that of the production facility 1000 of the first embodiment, the description thereof will be omitted. The fourth embodiment differs from the first embodiment in part of the information processing method.

In the above-described first embodiment, the proportionality constant L is registered in advance in the table 252. That is, the proportionality constant L is registered in the table 252 by a person, such as a worker or a user. In the fourth embodiment, however, the proportionality constant L is automatically registered by the signal processing portion 206. Hereinafter, features of the fourth embodiment different from those of the first embodiment will be described in detail, and the description of the same features will be omitted.

Figure 9:
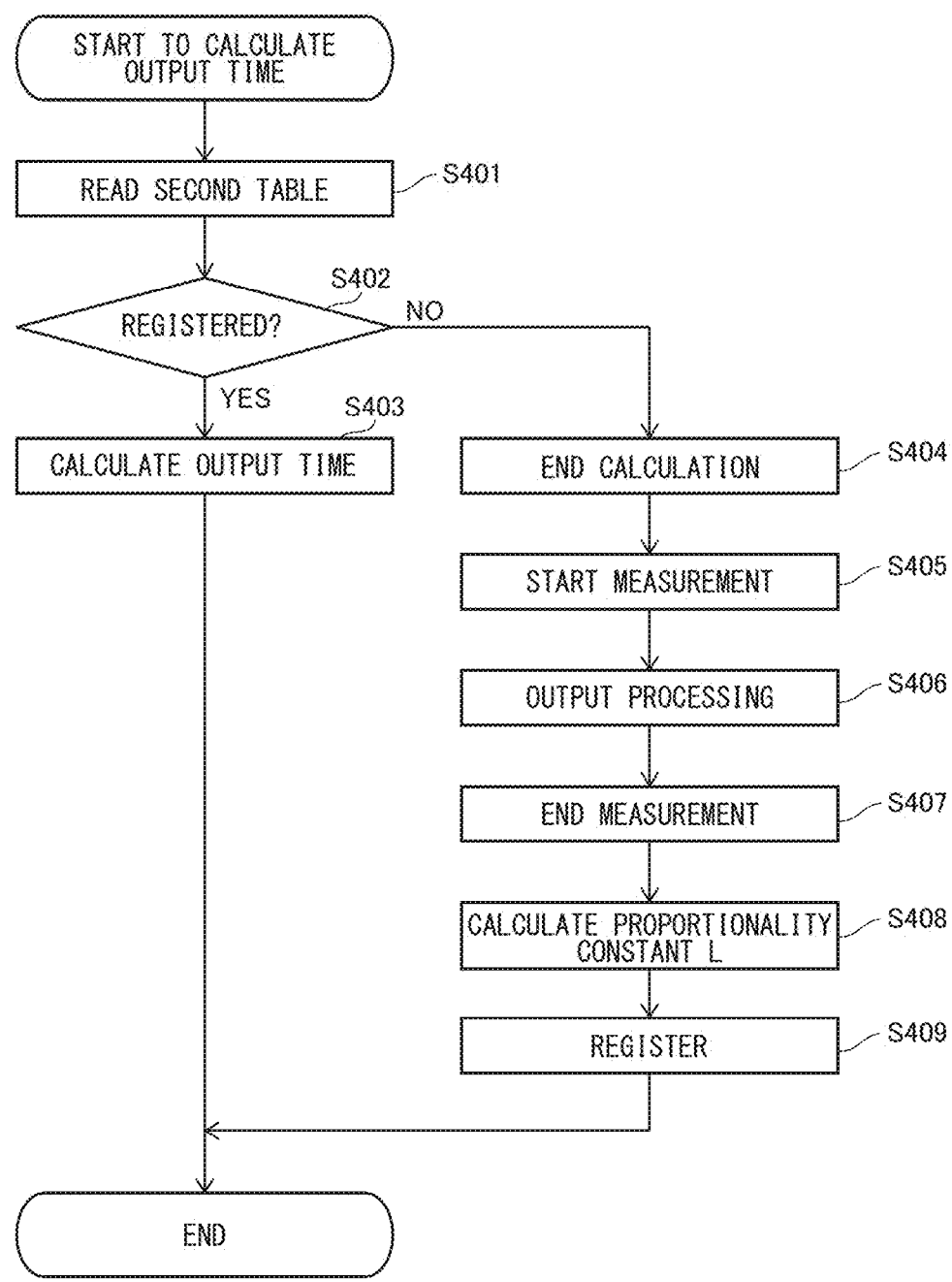
FIG. 9 is a flowchart illustrating a method of a fourth embodiment that determines an output time.

When the signal processing portion 206 calculates an execution time in Step S112 of FIG. 4, the signal processing portion 206 determines the output time, which is the third time included in the execution time. FIG. 9 is a flowchart illustrating a method of the fourth embodiment that determines the output time.

First, the signal processing portion 206 reads the table 252 of the proportionality constant L from the storage portion 210 (S401). The table 252 is the second table. Then the signal processing portion 206 determines whether a proportionality constant L corresponding to a way of outputting, which is included in each of the M number of measurement tasks of the task table 240, is registered in the table 252 (S402). If the proportionality constant L is registered in the table 252 (S402: YES), then the signal processing portion 206 refers to the table 252, and calculates an output time for each of the M number of measurement tasks (S403).

If at least one proportionality constant L is not registered in the table 251 (S402: NO), then the signal processing portion 206 sets a default value to the output time of a way of outputting for which the proportionality constant L is not registered, then ends the calculation process (S404), and then executes Step S113 of FIG. 4 and the following processes. When the signal processing portion 206 actually outputs the measurement data in Step S110 in the way of outputting, for which the proportionality constant L is not registered, the signal processing portion 206 starts to measure an actual output time of the output process (S405). Then the signal processing portion 206 executes the output process (S406), and ends the measurement of the output time when the output process is completed (S407). With this operation, the actual output time in the way of outputting is measured.

The signal processing portion 206 calculates the proportionality constant L of the way of outputting by dividing the measured output time by the number of samples that is set in the measurement task (S408). Then the signal processing portion 206 registers the calculated proportionality constant L in the table 252, associating the proportionality constant L with the way of outputting (S409). As described above, the signal processing portion 206 registers the proportionality constant L, which is based on the actually measured output time, in the table 252, associating the proportionality constant L with the way of outputting.

For example, the task (i.e., way of outputting) $306_1$ of the measurement task $310_1$ of the task table 240 is wireless communication, and the number of samples in the task $304_1$ is 5,000. Thus, the proportionality constant L corresponding to the wireless communication is automatically calculated by dividing the actually measured output time by 5,000.

By performing the above-described processes, a proportionality constant L that has not been registered in the table 252 is registered in the table 252. As a result, the work of a person, such as a worker or a user, to register the proportionality constant L in the table 252 can be eliminated, and the work load of the person can be reduced.

Fifth Embodiment

Next, an information processing method of a fifth embodiment will be described. Note that since the overall configuration of a production facility of the fifth embodiment is the same as that of the production facility 1000 of the first embodiment, the description thereof will be omitted. The fifth embodiment differs from the first embodiment in part of the information processing method.

In the above-described second embodiment, the priority is set by using the priority table 260 that is created in advance. In the present embodiment, a user causes the terminal 109 to refer to the storage portion 210 of the monitoring node apparatus 104, causes the display portion to display each of the measurement tasks, and sets a priority of a corresponding measurement task. The terminal 109 has part of the function of the processing portion. In the present embodiment, the description will be made, as an example, in detail for a case where the display portion of the terminal 109 displays each of the measurement tasks. However, a terminal such as a laptop personal computer may be connected to the monitoring node apparatus 104, and the display portion of the laptop personal computer may display each of the measurement tasks. The terminal 109 functions as an information processing apparatus that can communicate with the monitoring node apparatus 104. In another case, a plurality of terminals may be used, and one of the terminals and the monitoring node apparatus 104 may constitute the information processing apparatus.

Figure 10:
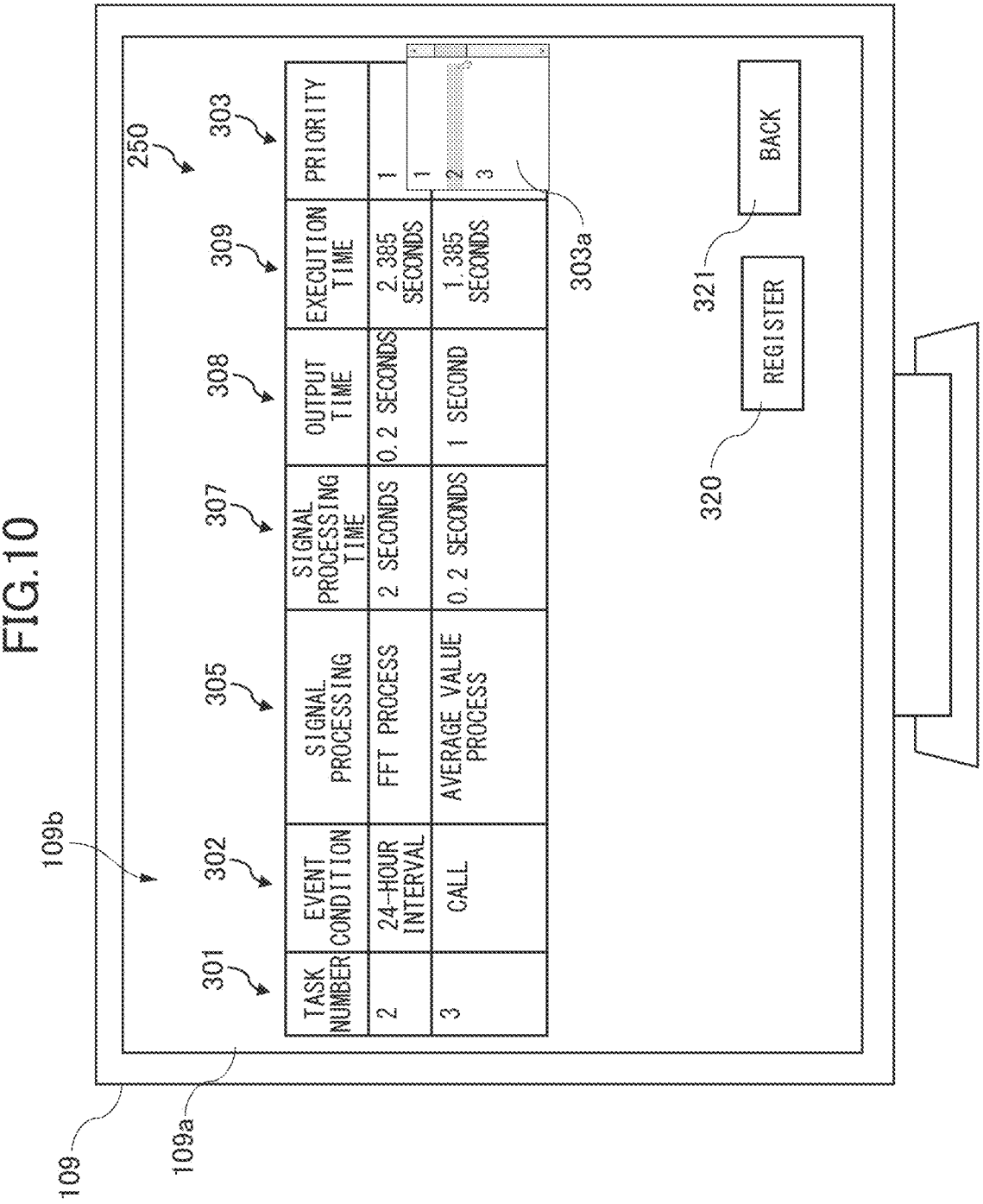
FIG. 10 is a diagram illustrating a setting screen of a fifth embodiment that is used for setting a priority.

FIG. 10 is a diagram illustrating one example of a setting screen 109b of the fifth embodiment displayed on the display portion 109a of the terminal 109 and used for setting priorities of the measurement tasks. The setting screen 109b illustrated in FIG. 10 is one example of a first screen. The monitoring node apparatus 104 of the present embodiment stores information on the signal processing time, the output time, and the execution time, which have been described in detail in the first embodiment, in the storage portion 210, associating the information with a corresponding measurement task.

If a user gives the terminal 109 an instruction for setting the priority of a measurement task, the terminal 109 refers to the task table 240 stored in the storage portion 210 of the monitoring node apparatus 104 and data that contains the information on each time. Then the terminal 109 extracts some of the items of each measurement task, associates the extracted items with the information on each time, and displays the extracted items and the information on each time, on the display portion 109a, as the setting table 250. The item 307 represents information on the signal processing time, the item 308 represents information on the output time, and the item 309 represents information on the execution time. In addition, the item 303 represents information on the priority, which is currently set. Note that the terminal 109 may display the information on the sampling time of each task, on the display portion 109a.

On the setting screen 109b illustrated in FIG. 10, the signal processing time, the output time, and the execution time of each of the measurement task $310_2$ having a task number of 2 and the measurement task $310_3$ having a measurement task of 3 are displayed. In addition, if a cell that belongs to the item 303 and that corresponds to a certain measurement task is clicked by a user, the terminal 109 displays a pull-down menu 303a for allowing the user to change the priority information. If the user changes the priority and clicks a registration button 320, the terminal 109 stores the priority, which has been changed by the user, in the storage portion 210. If the user clicks a back button 321, the terminal 109 does not store the priority, which has been changed by the user, in the storage portion 210. Specifically, if the registration button 320 is clicked, the terminal 109 instructs the monitoring node apparatus 104 to store the changed information in the storage portion 210, and then the monitoring node apparatus 104 updates the task table 240 of the storage portion 210, with the priority information that has been changed.

Figure 11:
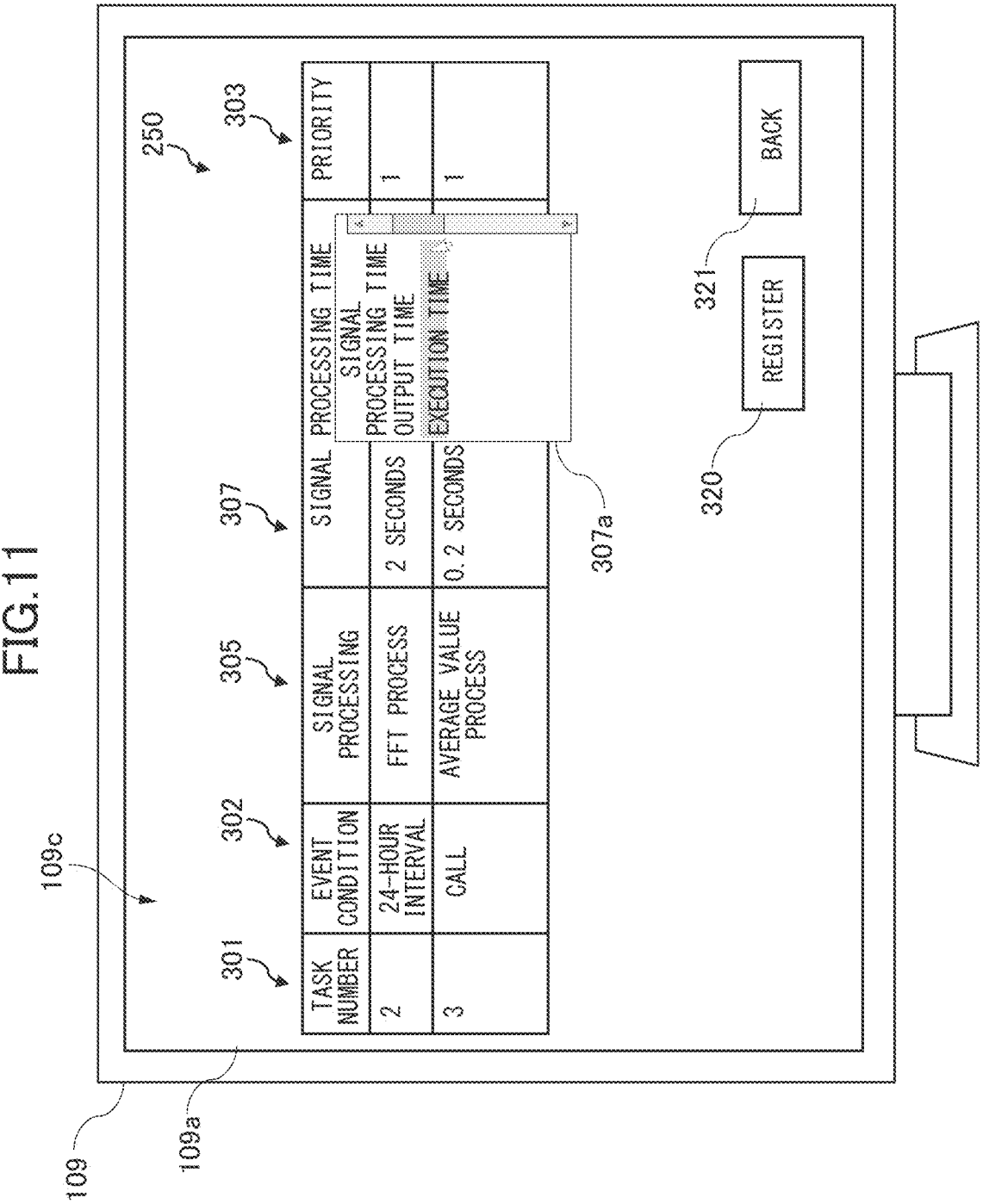
FIG. 11 is a diagram illustrating a setting screen of the fifth embodiment that is used for setting a priority.

FIG. 11 is a diagram illustrating one example of a setting screen 109c that is a modification of the fifth embodiment. Although the signal processing time, the output time, and the execution time are displayed in respective columns of the setting table 250 in FIG. 10, they may be displayed in a single column by using a pull-down menu 307a. In the example illustrated in FIG. 11, the information on the signal processing time is displayed in the column. However, if the pull-down menu 307a is used, the information on the signal processing time can be changed to the information on the output time or the execution time, and the information on the output time or the execution time can be displayed.

As described above, in the present embodiment, a user can set a priority while referring to the information on the signal processing time, the output time, and the execution time of each measurement task and the information on the event condition and a type of the signal processing of each measurement task. Therefore, a user can set an appropriate priority while referring to the characteristics of each measurement task.

Sixth Embodiment

Next, an information processing method of a sixth embodiment will be described. Note that since the overall configuration of a production facility of the sixth embodiment is the same as that of the production facility 1000 of the first embodiment, the description thereof will be omitted. The sixth embodiment differs from the first embodiment in part of the information processing method.

In the above-described fifth embodiment, the priority is inputted manually in the item 303 by a user. However, a user may set a reference item, and the terminal 109 may automatically set the priority, based on the reference item.

Figure 12:
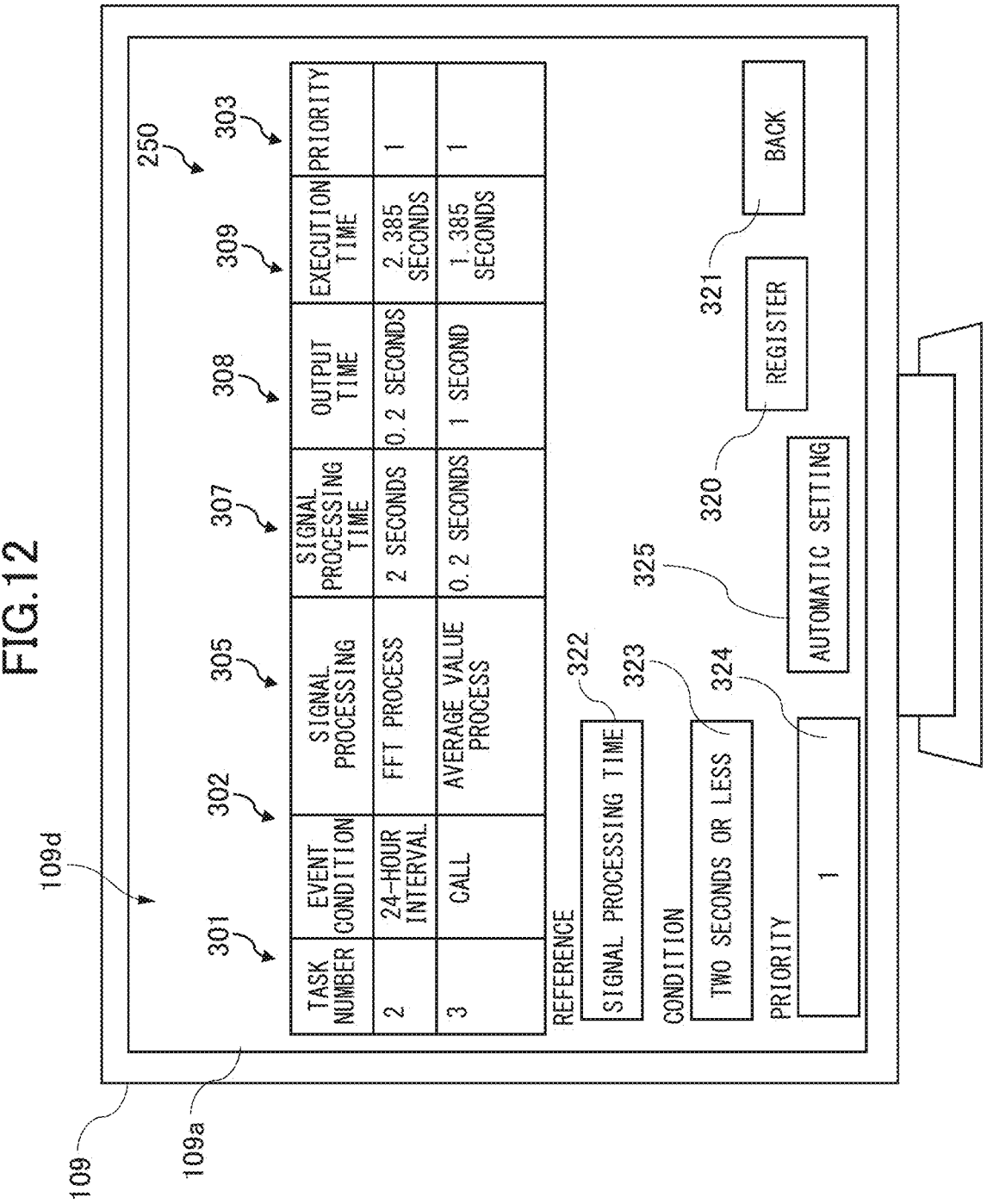
FIG. 12 is a diagram illustrating a setting screen of a sixth embodiment that is used for setting a priority.

FIG. 12 is a diagram illustrating one example of a setting screen 109d of the sixth embodiment displayed on the display portion 109a of the terminal 109 and used for setting priorities of the measurement tasks. The setting screen 109d illustrated in FIG. 12 is one example of a second screen. As illustrated in FIG. 12, in the present embodiment, the terminal 109 causes the display portion 109a to display a reference box 322, a condition box 323, a priority box 324, and an automatic-setting button 325. The reference box 322 is one example of a first box, the condition box 323 is one example of a second box, and the priority box 324 is one example of a third box.

The reference box 322 is a box in which a user can set an item (reference) that is focused on when the terminal 109 automatically sets the priority. In the example illustrated in FIG. 12, the signal processing time is set in the reference box 322, as an item that is focused on. The priority box 324 is a box in which a user can set a priority that will be automatically set by the terminal 109. In the example illustrated in FIG. 12, the number "1" is set in the priority box 324, as a priority. The condition box 323 is a box in which a user can set a condition under which the terminal 109 automatically sets a priority that is set in the priority box 324. The condition is a condition that the item, which is set in the reference box 322, is expected to satisfy. In the example illustrated in FIG. 12, a condition of 2 seconds or less is set in the condition box 323, as a condition that the reference is expected to satisfy.

If the automatic-setting button 325 is clicked by a user, a priority of 1 is automatically set for each of measurement tasks whose signal processing time is 2 seconds or less. In the example illustrated in FIG. 12, a priority of 1 is automatically set for each of the measurement task $310_2$ having a task number of 2 and the measurement task $310_3$ having a task number of 3.

Figure 13:
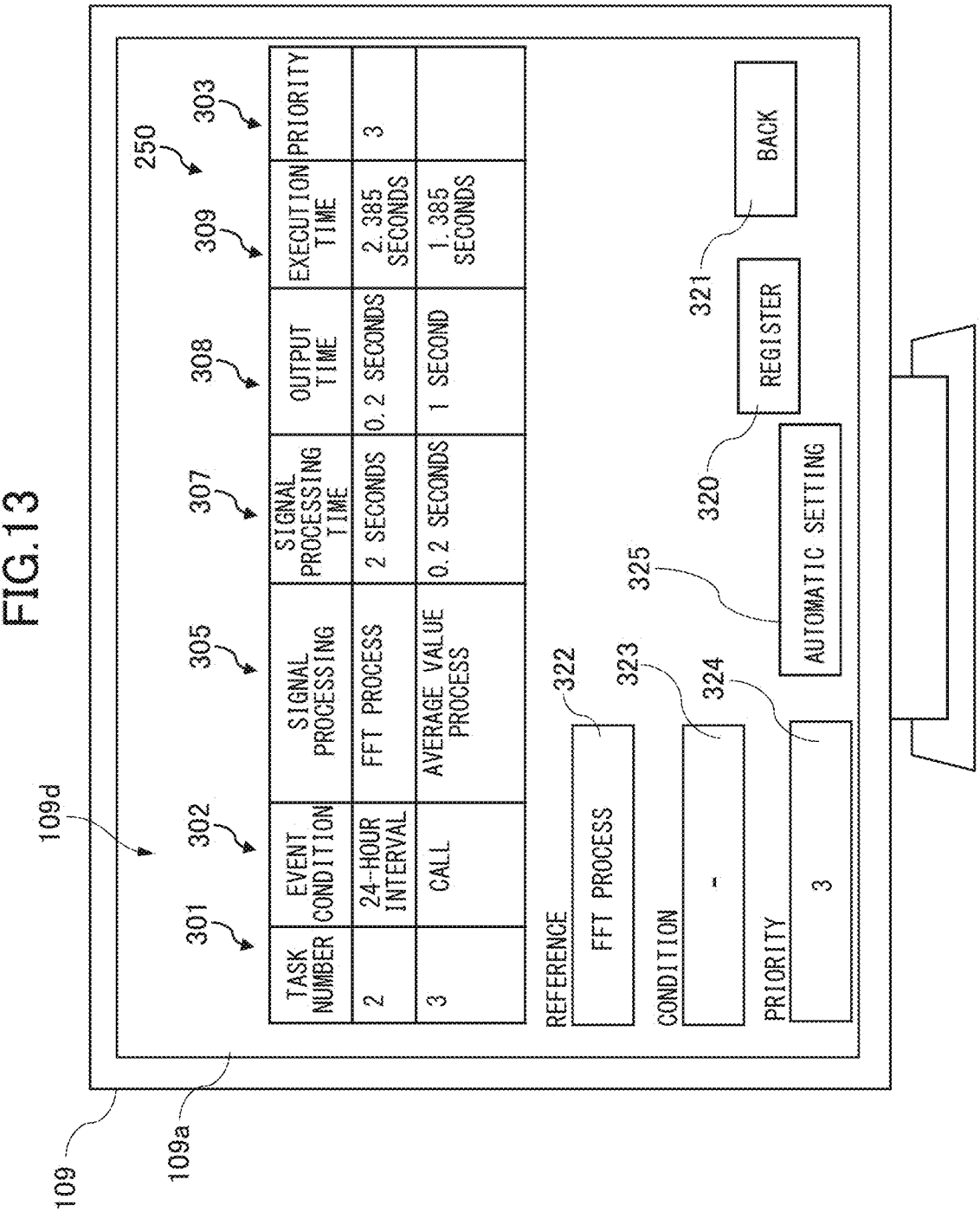
FIG. 13 is a diagram illustrating a setting screen of the sixth embodiment that is used for setting a priority.

As illustrated in FIG. 13, the signal processing information of the item 305 may be set in the reference box 322. In the example illustrated in FIG. 13, the FFT process is set in the reference box 322. In addition, in the example illustrated in FIG. 13, since the item that is focused on is a type of signal processing, a mark "-" is displayed in the condition box 323. In addition, the number "3" is set in the priority box 324.

If the automatic-setting button 325 is clicked, a priority of 3 is automatically set for a measurement task whose signal processing is the FFT process. In the example illustrated in FIG. 13, a priority of 3 is set for the measurement task $310_2$.

As described above, in the present embodiment, the priority of a measurement task can be automatically set by using a reference required by a user. Thus, in a case where an enormous number of measurement tasks is performed, the setting of priority can be easily and appropriately performed by automatically setting the priority.

Seventh Embodiment

Next, an information processing method of a seventh embodiment will be described. Note that since the overall configuration of a production facility of the seventh embodiment is the same as that of the production facility 1000 of the first embodiment, the description thereof will be omitted. The seventh embodiment differs from the first embodiment in part of the information processing method.

Figure 14:
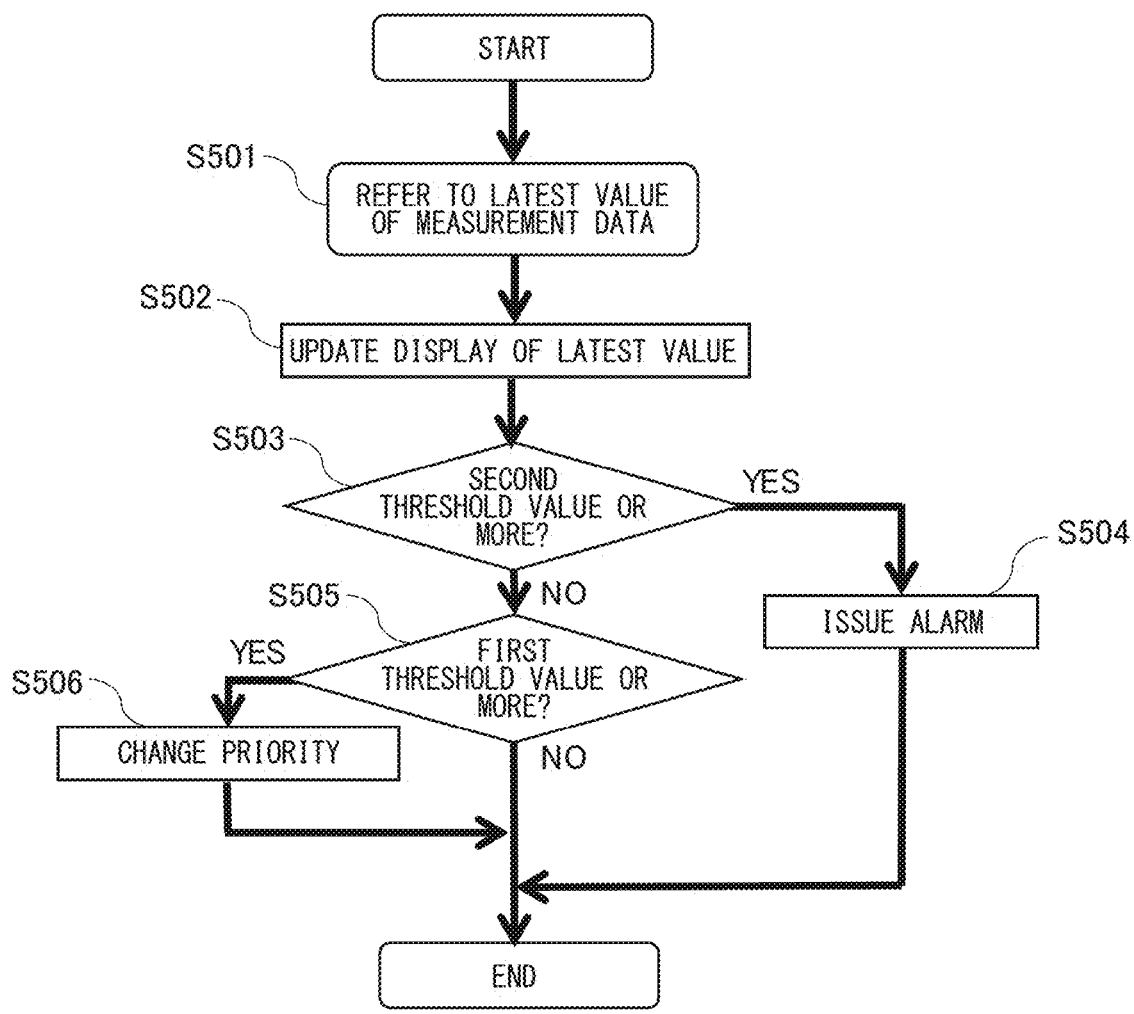
FIG. 14 is a flowchart of an information processing method of a seventh embodiment.
Figure 15:
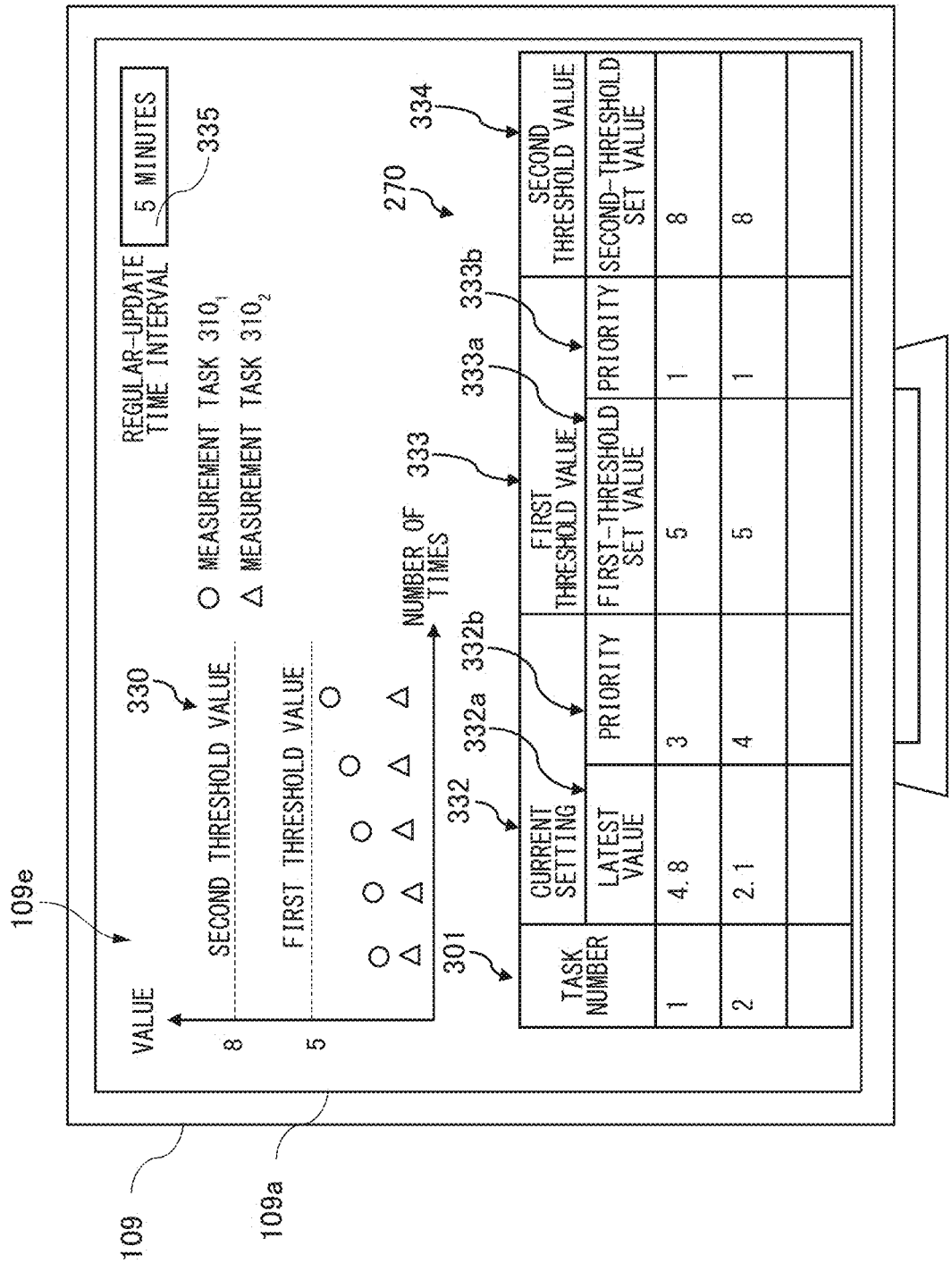
FIG. 15 is a diagram illustrating a setting screen of the seventh embodiment that is used for setting a priority.

In the seventh embodiment, the priority is set, based on the measurement data measured in each measurement task and stored in the database 108. FIG. 14 is a control flowchart of the seventh embodiment. FIG. 15 is a diagram illustrating one example of a setting screen 109e of the seventh embodiment displayed on the display portion 109a of the terminal 109 and used for setting priorities of the measurement tasks. The setting screen 109e illustrated in FIG. 15 is one example of a third screen.

As illustrated in FIG. 14, in Step S501, the terminal 109 accesses the database 108, and refers to the latest value of measurement data acquired by executing each measurement task. In Step S502, the terminal 109 updates the display with the latest value of measurement data. As illustrated in FIG. 15, the terminal 109 displays a measurement data graph 330 on which pieces of measurement data acquired in each measurement task are plotted. The horizontal axis represents the number of measurements; and in the measurement data graph 330, the measurement data acquired in the first measurement, the measurement data acquired in the second measurement, . . . are plotted in this order from the left side toward the right side. The vertical axis represents the value of measurement data. In addition, in the measurement data graph 330, pieces of measurement data acquired in the measurement task $310_1$ having a task number of 1 are shown by symbols "o", and pieces of measurement data acquired in the measurement task $310_2$ having a task number of 2 are shown by symbols "Δ".

As illustrated in FIG. 15, in the present embodiment, while displaying the measurement data graph 330, the terminal 109 also displays a setting table 270. An item 332 represents the latest value of measurement data that the terminal 109 refers to in Step S501 and S502, and a priority that is currently set in a measurement task. Specifically, an item 332a represents the latest value, and an item 332b represents the priority.

In addition, an item 333 represents a first threshold value of each measurement task, and an item 334 represents a second threshold value of each measurement task. Values of the items 333 and 334 can be changed by a user.

The first threshold value is a threshold value used for changing the priority of each measurement task. If a value of measurement data becomes equal to or larger than the first threshold value, the terminal 109 changes the priority. In an item 333a, the first threshold value, which is set, is displayed; and in an item 333b, a priority is set. If a value of measurement data becomes equal to or larger than the first threshold value, the current priority is changed to the priority that is set in the item 333b. In the measurement task $310_1$ having a task number of 1, the number "5" is set as the first threshold value, and the number "1" is set as the priority to which the current priority may be changed. Similarly, also in the measurement task $310_2$ having a task number of 2, the number "5" is set as the first threshold value, and the number "1" is set as the priority to which the current priority may be changed.

The second threshold value is a value, depending on which an alarm is issued for notifying a user of an abnormal state. Specifically, if a value of measurement data becomes equal to or larger than the second threshold value, the alarm is issued. The alarm may be issued by using any method, such as sending an electronic mail, ringing a buzzer, or turning on a lamp. In the measurement task $310_1$ having a task number of 1, the number "8" is set as the second threshold value. Similarly, also in the measurement task $310_2$ having a task number of 2, the number "8" is set as the second threshold value.

As illustrated in FIG. 14, in Step S503, the terminal 109 determines whether the latest value of measurement data is equal to or larger than the second threshold value. If the latest value of measurement data acquired in each of the measurement tasks is equal to or larger than the second threshold value (S503: YES), then the terminal 109 proceeds to Step S504, issues an alarm for a user, and ends the process. If the value of measurement data acquired in each of the measurement tasks is smaller than the second threshold value (S503: NO), then the terminal 109 proceeds to Step S505.

In Step S505, the terminal 109 determines whether the latest value of measurement data is equal to or larger than the first threshold value. If the latest value of measurement data acquired in each of the measurement tasks is equal to or larger than the first threshold value (S505: YES), then the terminal 109 proceeds to Step S506, and changes the priority of a measurement task that has measured the measurement data whose value is equal to or larger than the first threshold value. Then the terminal 109 sends the priority, to which the current priority has been changed, to the monitoring node apparatus 104; and the monitoring node apparatus 104 updates the task table 240. If the value of measurement data acquired in each of the measurement tasks is smaller than the first threshold value (S505: NO), then the terminal 109 ends the process. The above-described process is executed at time intervals that is set in a box 335 of FIG. 15, which indicates a column for entering a regular-update time interval. In the example illustrated in FIG. 15, the process is executed at time intervals of 5 minutes.

As described above, in the present embodiment, the priority of the measurement tasks can be changed, based on the measurement data. In particular, since the first threshold value and the second threshold value are set, a measurement task that has measured a piece of measurement data whose value is equal to the first threshold value can be provided with an increased priority, and monitored, as a task that needs caution. Thus, any abnormal state of the object that is being monitored can be detected early. In addition, if the value of a piece of measurement data becomes equal to the second threshold value, an alarm is issued for notifying a user of an abnormal state. Thus, the user can immediately perform maintenance on the object that is being monitored.

Eighth Embodiment

Next, an information processing method of an eighth embodiment will be described. Note that since the overall configuration of a production facility of the eighth embodiment is the same as that of the production facility 1000 of the first embodiment and the seventh embodiment, the description thereof will be omitted. The eighth embodiment differs from the first embodiment and the seventh embodiment in part of the information processing method.

Figure 16:
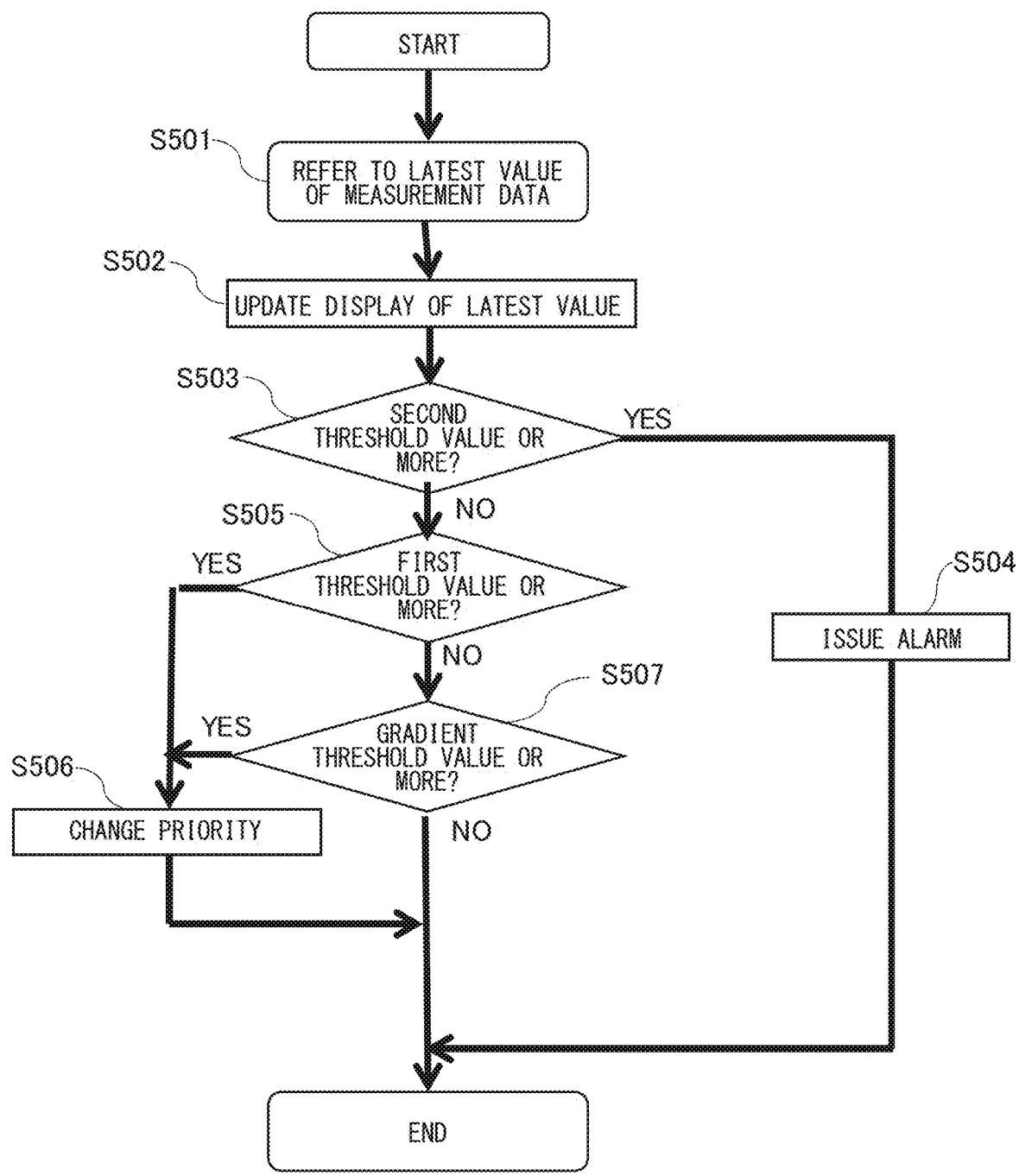
FIG. 16 is a flowchart of an information processing method of an eighth embodiment.
Figure 17:
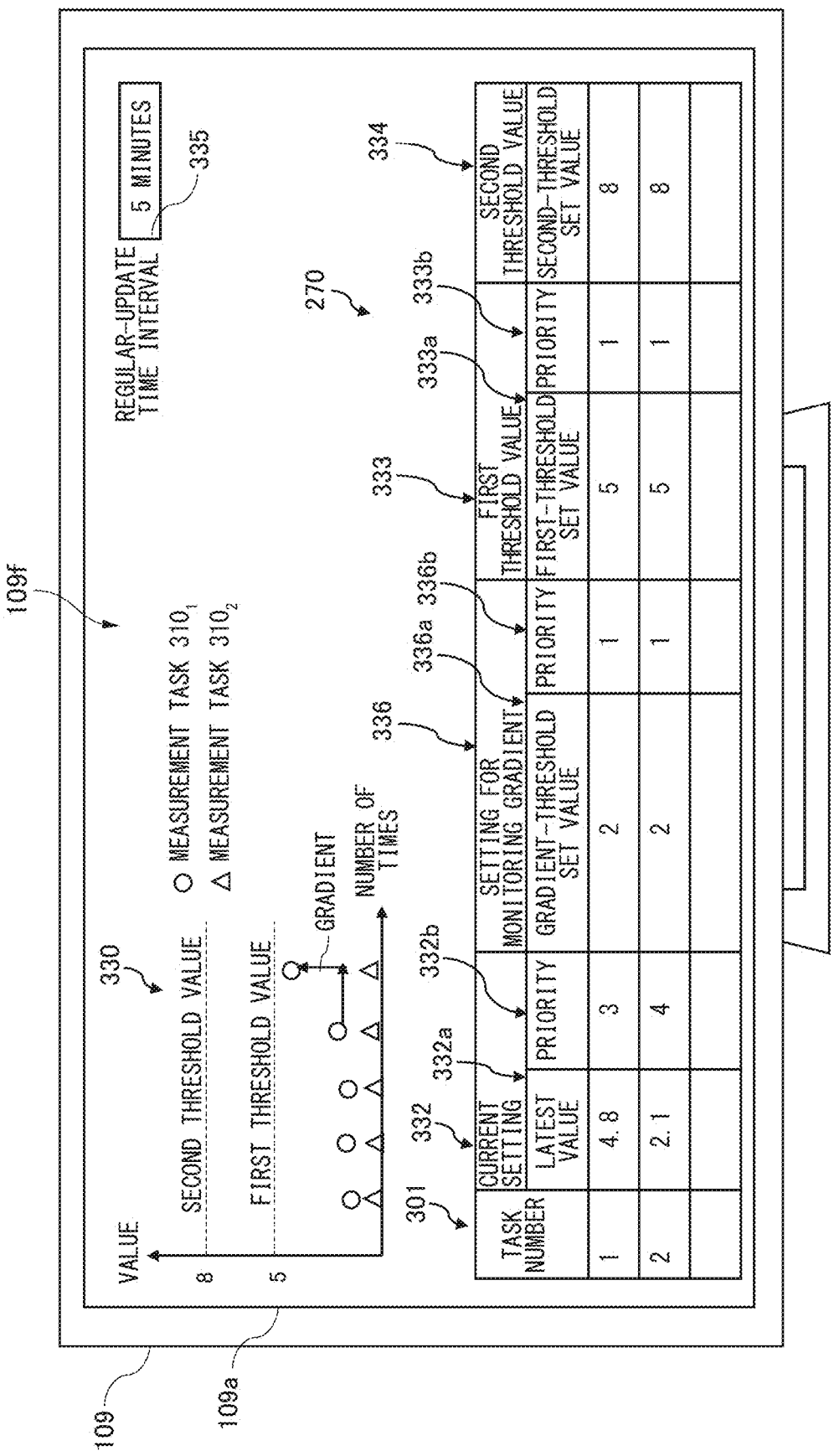
FIG. 17 is a diagram illustrating a setting screen of the eighth embodiment that is used for setting a priority.

In the above-described seventh embodiment, the priority of a measurement task that has measured a piece of measurement data whose value is equal to or larger than the first threshold value is changed. In the eighth embodiment, even if the measurement data is smaller than the first threshold value, the priority of a measurement task that has measured a piece of measurement data whose value changed rapidly is changed. FIG. 16 is a control flowchart of the eighth embodiment. FIG. 17 is a diagram illustrating one example of a setting screen 109f of the eighth embodiment displayed on the display portion 109a of the terminal 109 and used for setting priorities of the measurement tasks. The setting screen 109f illustrated in FIG. 17 is one example of the third screen.

The eighth embodiment differs from the seventh embodiment in that the terminal 109 determines in Step S507 of FIG. 16 whether a gradient (amount of change) of the measurement data is equal to or larger than a gradient threshold value, and that an item 336 illustrated in FIG. 17 is provided for the setting of monitoring the gradient. In the item 336, an item 336a for setting a gradient threshold value, and an item 336b for a user to set a priority used when the gradient threshold value is reached or exceeded are shown. The gradient threshold value is one example of a third threshold value, which is a threshold value to the amount of change of the latest measurement data to the previous measurement data. In the measurement task $310_1$ having a task number of 1, the number "2" is set as the gradient threshold value, and the number "1" is set as a priority to which the current priority will be changed when the gradient threshold value is reached or exceeded. Similarly, also in the measurement task $310_2$ having a task number of 2, the number "2" is set as the gradient threshold value, and the number "1" is set as a priority to which the current priority will be changed when the gradient threshold value is reached or exceeded.

In Step S507, the terminal 109 determines whether the gradient of the latest value of measurement data is equal to or larger than the gradient threshold value. If the gradient of the latest value of measurement data is equal to or larger than the gradient threshold value (S507: YES), then the terminal 109 proceeds to Step S506, and changes the priority of a measurement task that has measured the measurement data whose gradient is equal to or larger than the gradient threshold value. Then the terminal 109 sends the priority, to which the current priority has been changed, to the monitoring node apparatus 104; and the monitoring node apparatus 104 updates the task table 240. If the gradient of the latest value of measurement data acquired in the measurement tasks is smaller than the gradient threshold value (S507: NO), then the terminal 109 ends the process. The above-described process is executed at time intervals that is set in a box 335 of FIG. 17, which indicates a column for entering a regular-update time interval. In the present embodiment, the process is executed at time intervals of 5 minutes.

As described above, in the present embodiment, the priority of the measurement tasks can be changed, based on the measurement data. In particular, since the gradient threshold value is set, a measurement task that has measured a piece of measurement data that changed rapidly can also be provided with an increased priority, and monitored, as a task that needs caution. Thus, any abnormal state of the object that is being monitored can be detected early.

The present invention is not limited to the above-described embodiments, and can be variously modified within the technical concept of the present invention. In addition, since the effects described in the embodiments are those that are most suitably produced from the present invention, the effects of the present invention are not limited to the effects described in the embodiments.

In the above-described embodiments, the description has been made for the case where the plurality of sensors 102 and 103 are disposed in the machine apparatus 101 that is to be monitored. However, the present disclosure is not limited to this. For example, only one sensor may be disposed in the machine apparatus 101. In this case, the monitoring node apparatus 104 may use the only one sensor and execute each of the plurality of measurement tasks.

In addition, in the above-described embodiments, the description has been made for the case where the machine apparatus 101 that is to be monitored is a pump, as one example. However, the present disclosure is not limited to this. For example, the machine apparatus 101 may be a six-axis articulated robot, or may be a machine apparatus that can automatically perform expansion and contraction, bending and stretching, up-and-down movement, right-and-left movement, pivot, or combined movement thereof, in accordance with information stored in the storage device of the control device.

Modifications

The present invention may be embodied by supplying a program that achieves one or more functions of the above-described embodiments, to a system or a device via a network or a storage medium, and by causing one or more processors of the system or the device to read and execute the program. The present invention may also be embodied by using a circuit (e.g., ASIC) that achieves one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-185175, filed Nov. 5, 2020, and Japanese Patent Application No. 2021-134217, filed Aug. 19, 2021, which are hereby incorporated by reference herein in their entirety.

What is claimed is:

1. An information processing apparatus configured to be connected to a sensor used to measure a state of a machine apparatus, the information processing apparatus comprising:
a processing portion configured to measure the state of the machine apparatus by using the sensor and executing a measurement task corresponding to an event condition that has been satisfied, the event condition being of at least two or more event conditions associated with at least two or more measurement tasks,
wherein the processing portion is configured to execute a priority process in which when two or more event conditions of at least two or more event conditions have been satisfied, two or more measurement tasks corresponding to the two or more event conditions are executed in order of priority, and
wherein the processing portion is configured to display a screen on which a priority of the measurement task can be set, based on information related to a type of processing of the measurement task.

2. The information processing apparatus according to claim 1, wherein if the two or more measurement tasks include at least two measurement tasks having an identical priority, the processing portion is configured to execute the at least two measurement tasks having the identical priority in increasing order of execution time in the priority process.

3. The information processing apparatus according to claim 2, wherein the processing portion is configured to estimate the execution time of each of the at least two measurement tasks having the identical priority before executing the at least two measurement tasks.

4. The information processing apparatus according to claim 1, further comprising an AD conversion portion configured to perform an AD conversion process that converts an analog signal sent from the sensor to a digital signal,
wherein the processing portion is configured to perform signal processing on the digital signal and produce measurement data.

5. The information processing apparatus according to claim 4, further comprising an output portion configured to output the measurement data produced by the processing portion.

6. The information processing apparatus according to claim 1, wherein the processing portion is configured to execute a measurement task corresponding to an event condition that has been satisfied, by referring to a task table in which the at least two or more event conditions and the at least two or more measurement tasks are associated with each other.

7. The information processing apparatus according to claim 6, wherein in the task table, each of the at least two or more measurement tasks is assigned with a corresponding priority.

8. The information processing apparatus according to claim 4, wherein the processing portion is configured to determine priorities of the two or more measurement tasks by referring to a priority table in which a priority is assigned to each type of the signal processing.

9. The information processing apparatus according to claim 5, wherein the measurement task includes a first task in which the AD conversion portion executes the AD conversion process, a second task in which the processing portion performs the signal processing on the digital signal and produces the measurement data, and a third task in which the output portion outputs the measurement data.

10. The information processing apparatus according to claim 9, wherein an execution time required to execute the measurement task includes a first time required to execute the first task, a second time required to execute the second task, and a third time required to execute the third task.

11. The information processing apparatus according to claim 10, wherein the processing portion is configured to determine the first time, based on a sampling frequency and a number of samples that the AD conversion portion uses for performing the AD conversion process.

12. The information processing apparatus according to claim 10, wherein the processing portion is configured to determine the second time, based on a number of samples that the AD conversion portion uses for performing the AD conversion process, and a proportionality constant that corresponds to a type of the signal processing.

13. The information processing apparatus according to claim 12, wherein the processing portion is configured to determine the second time by referring to a table in which the type of the signal processing and the proportionality constant are associated with each other.

14. The information processing apparatus according to claim 13, wherein the processing portion is configured to register the proportionality constant, based on the second time that is actually measured, in the table, associating the proportionality constant with the type of the signal processing.

15. The information processing apparatus according to claim 10, wherein the processing portion is configured to determine the third time, based on a number of samples that the AD conversion portion uses for performing the AD conversion process, and a proportionality constant that corresponds to a way of outputting of the output portion.

16. The information processing apparatus according to claim 15, wherein the processing portion is configured to determine the third time by referring to a table in which the way of outputting and the proportionality constant are associated with each other.

17. The information processing apparatus according to claim 16, wherein the processing portion is configured to register the proportionality constant, based on the third time that is actually measured, in the table, associating the proportionality constant with the way of outputting.

18. The information processing apparatus according to claim 10, wherein the information processing apparatus is configured to allow setting the priority of the measurement task on the screen based on the first time, the second time, and the third time.

19. The information processing apparatus according to claim 10, wherein the screen is a first screen, and
wherein the information processing apparatus is configured to display a second screen on which a priority of the measurement task is able to be automatically set, based on at least one of the first time, the second time, and the third time.

20. The information processing apparatus according to claim 19, wherein the second screen comprises:
a first box in which a reference used to automatically set a priority of the measurement task is set;
a second box in which a condition used to automatically set a priority of the measurement task and defined for the reference is set; and
a third box in which a priority is set for being automatically set for the measurement task if the reference satisfies the condition defined for the reference.

21. The information processing apparatus according to claim 20, wherein in the first box, a type of processing performed in the measurement task is able to be set.

22. The information processing apparatus according to claim 1, wherein the screen is a first screen, and
wherein the information processing apparatus is configured to display a second screen on which a priority of the measurement task is able to be set, based on measurement data measured in the measurement task.

23. The information processing apparatus according to claim 22, wherein a threshold value for the measurement data is able to be set on the second screen, for automatically changing a priority of the measurement task.

24. The information processing apparatus according to claim 22, wherein a threshold value for the measurement data is able to be set on the second screen, for issuing an alarm.

25. The information processing apparatus according to claim 22, wherein a threshold value for amount of change of the measurement data is able to be set on the second screen, for automatically changing a priority of the measurement task.

26. The information processing apparatus according to claim 22, wherein the measurement data is displayed in a graph on the second screen.

27. The information processing apparatus according to claim 1, wherein the priority process is executed when the two or more event conditions have been satisfied simultaneously or substantially simultaneously.

28. A system comprising:
a gateway apparatus;
a sensor used to measure a state of a machine apparatus; and
a node apparatus connected with the sensor and configured to transmit measurement data to the gateway apparatus by using wireless communications or wire communications,
the node apparatus comprising:
a processing portion configured to measure the state of the machine apparatus by using the sensor and executing a measurement task corresponding to an event condition that has been satisfied, the event condition being of at least two or more event conditions associated with at least two or more measurement tasks,
wherein the processing portion is configured to execute a priority process in which when two or more event conditions of at least two or more event conditions have been satisfied, two or more measurement tasks corresponding to the two or more event conditions are executed in order of priority, and
wherein the processing portion is configured to display a screen on which a priority of the measurement task can be set, based on information related to a type of processing of the measurement task.

29. The system according to claim 28, wherein if the two or more measurement tasks include at least two measurement tasks having an identical priority, the processing portion is configured to execute the at least two measurement tasks having the identical priority in increasing order of execution time in the priority process.

30. A production facility comprising:
the system according to claim 28; and
the machine apparatus.

31. An information processing method that causes a processing portion to measure a state of a machine apparatus by using a sensor and executing a measurement task corresponding to an event condition that has been satisfied, the event condition being of at least two or more event conditions associated with at least two or more measurement tasks, the method comprising:
executing, by the processing portion, a priority process in which when two or more event conditions of the plurality of event conditions have been satisfied, two or more measurement tasks corresponding to the two or more event conditions are executed in order of priority,
wherein processing portion displays a screen on which a priority of the measurement task can be set, based on information related to a type of processing of the measurement task.

32. The information processing method according to claim 31, the method further comprising executing, by the processing portion, at least two measurement tasks in increasing order of execution time in the priority process, if the two or more measurement tasks include the at least two measurement tasks having an identical priority.

33. A method of manufacturing products while causing the system of the production facility according to claim 30 to acquire a state of a machine apparatus.

34. A computer-readable non-transitory recording medium that stores a program that causes a computer to execute the information processing method according to claim 31.

35. The information processing apparatus according to claim 1, wherein the information related to the type of processing includes at least one of information on an execution time of the measurement task, information on a type of signal processing of the measurement task, or information on a measurement data by the measurement task.

36. The information processing apparatus according to claim 35, wherein the information on the execution time of the measurement task includes first time information required for the processing portion to convert a signal from the sensor, second time information required for the processing portion to apply signal processing to the converted signal to generate a measurement data, and third time information required for the processing portion to output the measurement data.

37. The information processing apparatus according to claim 35, wherein the information on the type of signal processing of the measurement task includes at least one of a relay process, an FFT process, a partial overall process, an envelope process, a frequency filter process, a differential process, an integral process, a wavelet process, an average value process, a standard deviation process, a maximum value process, a minimum value process, a peak-to-peak process, a peak hold process, an effective value process, a crest factor process, a form factor process, an impulse coefficient process, a margin coefficient process, or a machine-learning-model inference process.

38. The information processing apparatus according to claim 1, wherein the priority of measurement task is able to be set, based on event conditions on the screen.

39. The information processing apparatus according to claim 38, wherein the event conditions include at least one of a measurement time interval of the measurement task, a measurement start time of the measurement task, a trigger input from an external apparatus, or a call from an external apparatus.

40. The information processing apparatus according to claim 1, wherein the screen is a first screen, and
wherein the processing portion is configured to display a second screen on which the priority of the measurement task is able to be automatically set, based on the information related to the type of processing of the measurement task.

41. The information processing apparatus according to claim 40, wherein the second screen comprises:
a first box in which a reference used to automatically set a priority of the measurement task is set;
a second box in which a condition used to automatically set a priority of the measurement task and defined for the reference is set; and
a third box in which a priority is set for being automatically set for the measurement task if the reference satisfies the condition defined for the reference.

42. The information processing apparatus according to claim 41, wherein in the first box, the type of processing performed in the measurement task is able to be set.

* * * * *